US011001375B2

(12) United States Patent
Holemans et al.

(10) Patent No.: US 11,001,375 B2
(45) Date of Patent: May 11, 2021

(54) STRUCTURALLY TUNABLE CORES

(71) Applicant: The Boeing Company, Chicago, IL (US)

(72) Inventors: Peter Holemans, Ridley Park, PA (US); Michael J. Deluca, Norristown, PA (US); Douglas R. Ludin, Malvern, PA (US)

(73) Assignee: THE BOEING COMPANY, Chicago, IL (US)

( * ) Notice: Subject to any disclaimer, the term of this patent is extended or adjusted under 35 U.S.C. 154(b) by 134 days.

(21) Appl. No.: 16/356,724

(22) Filed: Mar. 18, 2019

(65) Prior Publication Data

US 2020/0298969 A1 Sep. 24, 2020

(51) Int. Cl.
*B64C 27/33* (2006.01)
*B64C 27/00* (2006.01)
*B64C 27/48* (2006.01)

(52) U.S. Cl.
CPC ............ *B64C 27/33* (2013.01); *B64C 27/001* (2013.01); *B64C 27/48* (2013.01); *B64C 2027/003* (2013.01)

(58) Field of Classification Search
CPC ....... B64C 27/001; B64C 27/33; B64C 27/48; B64C 2027/003
See application file for complete search history.

(56) References Cited

U.S. PATENT DOCUMENTS

| | | | |
|---|---|---|---|
| 4,462,755 A | 7/1984 | Ogle et al. | |
| 4,822,245 A * | 4/1989 | Aubry | B64C 27/33 |
| | | | 267/140.11 |
| 6,641,121 B1 * | 11/2003 | Carlstedt | F16F 1/18 |
| | | | 267/219 |
| 6,739,834 B2 * | 5/2004 | Mochida | B64C 27/33 |
| | | | 416/134 A |
| 9,713,917 B2 * | 7/2017 | Ross | B32B 37/142 |

(Continued)

FOREIGN PATENT DOCUMENTS

| | | |
|---|---|---|
| EP | 2949579 | 12/2015 |
| EP | 3333074 | 6/2018 |

OTHER PUBLICATIONS

European Patent Office, "Extended European Search Report," issued in connection with European Patent Application No. 20163440.9, dated Aug. 7, 2020, 7 pages.

*Primary Examiner* — Brian P Wolcott
(74) *Attorney, Agent, or Firm* — Hanley, Flight & Zimmerman, LLC

(57) ABSTRACT

Structurally tunable cores are described that can be implemented, for example, in aircraft components. An example flex beam for coupling a rotor blade to a rotor hub includes a first composite laminate, a second composite laminate, a third composite laminate, first resilient core members and second resilient core members. The first composite laminate forms a first skin of the flex beam. The second composite laminate is located opposite the first composite laminate and forms a second skin of the flex beam. The third composite laminate is located between the first composite laminate and the second composite laminate. The first resilient core members extend between the first composite laminate and the third composite laminate. The second resilient core members extend between the second composite laminate and the third composite laminate.

26 Claims, 15 Drawing Sheets

(56) References Cited

U.S. PATENT DOCUMENTS

| | | | |
|---|---|---|---|
| 10,005,552 B2* | 6/2018 | Buesing | B64C 27/33 |
| 10,605,631 B2* | 3/2020 | Schenck | B64D 45/00 |
| 10,773,821 B2* | 9/2020 | Bolukbasi | B32B 3/18 |
| 2014/0120317 A1* | 5/2014 | Zafiris | B29C 70/086 |
| | | | 428/160 |
| 2019/0389557 A1* | 12/2019 | Hethcock, Jr. | B64C 3/26 |

* cited by examiner

STRUCTURALLY TUNABLE CORES

FIELD OF THE DISCLOSURE

This disclosure relates generally to structural cores and, more specifically, to structurally tunable cores that can be implemented, for example, in aircraft components.

BACKGROUND

In nature, bird wings include a highly integrated muscular and skeletal structure that advantageously enables the wings to operate over a large range of motion with variable stiffness. Known efforts to implement a biomimetic solution for aircraft components (e.g., rotors, wings, etc.) that mimics the operational capabilities associated with bird wings have long been hampered by limitations in designs, structural analyses, and material capabilities.

Implementing aircraft components that foster a reduction in the overall part count of the aircraft (e.g., relative to other candidate components) can be advantageous. For example, the implementation of flex beams in an aircraft rotor can advantageously replace complex hinges that would otherwise be required to couple the blades of the aircraft rotor to the hub of the aircraft rotor. Known flex beam implementations are limited, however, in terms of the degree and/or extent of vertical deflection (e.g., flapping) that is attainable via the flex beam while maintaining adequate chordwise and spanwise stiffnesses via the flex beam.

SUMMARY

Structurally tunable cores that can be implemented, for example, in aircraft components (e.g., flex beams, hybrid elastomeric bearings, non-pneumatic tires, etc.) are disclosed. In some examples, a flex beam for coupling a rotor blade to a rotor hub is disclosed. In some disclosed examples, the flex beam comprises a first composite laminate, a second composite laminate, a third composite laminate, first resilient core members, and second resilient core members. In some disclosed examples, the first composite laminate forms a first skin of the flex beam. In some disclosed examples, the second composite laminate is located opposite the first composite laminate and forms a second skin of the flex beam. In some disclosed examples, the third composite laminate is located between the first composite laminate and the second composite laminate. In some disclosed examples, the first resilient core members extend between the first composite laminate and the third composite laminate. In some disclosed examples, the second resilient core members extend between the second composite laminate and the third composite laminate.

In some examples, an apparatus is disclosed. In some disclosed examples, the apparatus comprises a first composite laminate, a second composite laminate, a third composite laminate, first resilient core members, and second resilient core members. In some disclosed examples, the first composite laminate forms a first skin. In some disclosed examples, the second composite laminate is located opposite the first composite laminate and forms a second skin. In some disclosed examples, the third composite laminate is located between the first composite laminate and the second composite laminate. In some disclosed examples, the first resilient core members extend between the first composite laminate and the third composite laminate. In some disclosed examples, the second resilient core members extend between the second composite laminate and the third composite laminate.

In some examples, a hybrid elastomeric bearing is disclosed. In some disclosed examples, the hybrid elastomeric bearing comprises a first annulus, a second annulus, resilient core members, a first elastomeric member, and a second elastomeric member. In some disclosed examples, the second annulus circumscribes the first annulus. In some disclosed examples, the resilient core members are arranged about a circumference of the first annulus and extend radially outwardly from the first annulus to the second annulus. In some disclosed examples, respective ones of the resilient core members are spaced apart from one another and include a first segment, a second segment, and a third segment. In some disclosed examples, the second segment extends from the first segment in a first direction defined by a first radius of curvature between the first and second segments. In some disclosed examples, the third segment extends from the second segment in a second direction defined by a second radius of curvature between the second and third segments. In some disclosed examples, the first elastomeric member extends between first neighboring ones of the resilient core members. In some disclosed examples, the second elastomeric member extends between second neighboring ones of the resilient core members. In some disclosed examples, the second neighboring ones are spaced apart from the first neighboring ones.

In some examples, a non-pneumatic tire is disclosed. In some disclosed examples, the non-pneumatic tire comprises a hub, a rim, and resilient core members. In some disclosed examples, the rim circumscribes the hub. In some disclosed examples, the resilient core members are arranged about a circumference of the hub and extend radially outwardly from the hub to the rim. In some disclosed examples, respective ones of the resilient core members are spaced apart from one another and include a first segment, a second segment, and a third segment. In some disclosed examples, the second segment extends from the first segment in a first direction defined by a first radius of curvature between the first and second segments. In some disclosed examples, the third segment extends from the second segment in a second direction defined by a second radius of curvature between the second and third segments.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

In nature, bird wings include a highly integrated muscular and skeletal structure that advantageously enables the wings to operate over a large range of motion with variable stiffness. Known efforts to implement a biomimetic solution for aircraft components (e.g., rotors, wings, etc.) that mimics the operational capabilities associated with bird wings have long been hampered by limitations in designs, structural analyses, and material capabilities.

Implementing aircraft components that foster a reduction in the overall part count of the aircraft (e.g., relative to other candidate components) can be advantageous. For example, the implementation of flex beams in an aircraft rotor can advantageously replace complex hinges that would otherwise be required to couple the blades of the aircraft rotor to the hub of the aircraft rotor. Known flex beam implementations (e.g., as described below in connection with FIGS. 2 and 3) are limited, however, in terms of the degree and/or extent of vertical deflection (e.g., flapping) that is attainable via the flex beam while maintaining adequate chordwise and spanwise stiffnesses via the flex beam.

Figure 1:
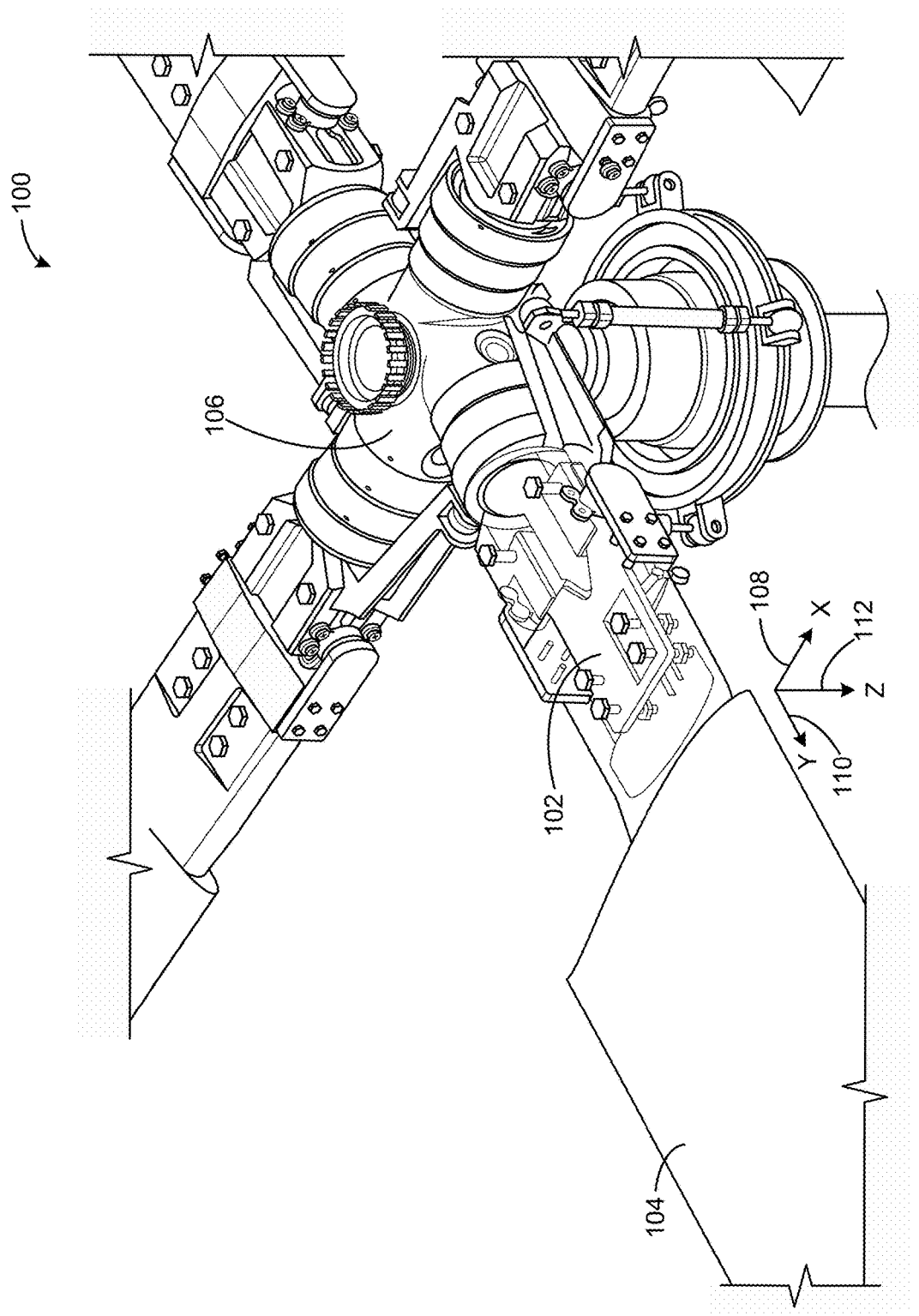
FIG. 1 is a partial cutaway perspective view of a known aircraft rotor having a flex beam.

FIG. 1 is a partial cutaway perspective view of a known aircraft rotor 100 having a flex beam 102. The flex beam 102 of FIG. 1 couples a rotor blade 104 of the aircraft rotor 100 to a rotor hub 106 of the aircraft rotor 100. The rotor blade 104 of FIG. 1 has a chord and a span. The chord of the rotor blade 104 extends along the x-axis 108 shown in FIG. 1, and the span of the rotor blade 104 extends along the y-axis 110 shown in FIG. 1. The flex beam 102 of FIG. 1 has a first stiffness (e.g., a chordwise stiffness) along the x-axis 108, a second stiffness (e.g., a spanwise stiffness) along the y-axis 110, and a third stiffness (e.g., a flapwise stiffness) along the z-axis 112 shown in FIG. 1.

The flex beam 102 of FIG. 1 is structured, configured and/or arranged to have a third stiffness that facilitates a corresponding extent and/or degree of flapwise deflection of the flex beam 102 along the z-axis 112, and/or a corresponding extent and/or degree of flapwise deflection of the rotor blade 104 relative to the rotor hub 106 along the z-axis 112. Known implementations of the flex beam 102 of FIG. 1 are limited and/or restrictive in terms of the extent and/or degree of flapwise deflection that is attainable along the z-axis 112 while maintaining sufficient chordwise and/or spanwise stiffnesses of the flex beam 102 along the x-axis 108 and the y-axis 110.

Figure 2:
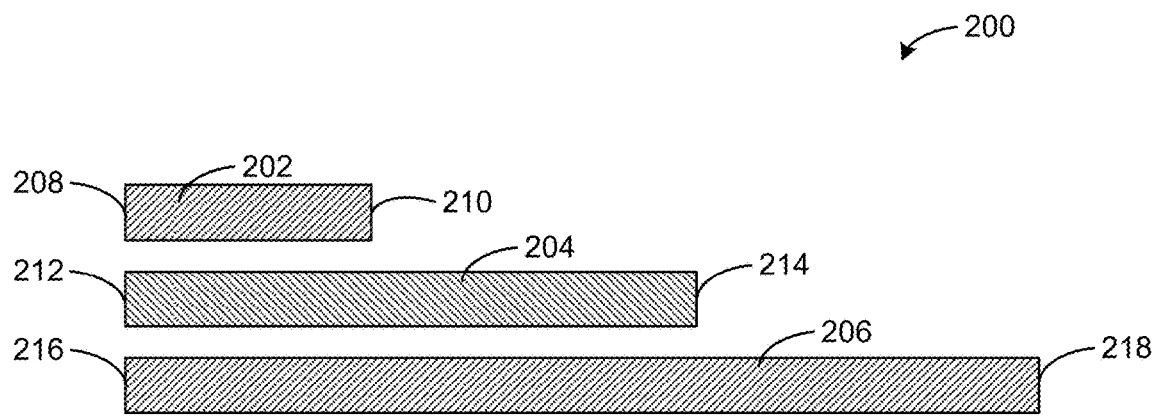
FIG. 2 is a cross-sectional view of a known configuration of independent plates for implementing a flex beam.

For example, FIG. 2 is a cross-sectional view of a known configuration of independent plates 200 for implementing a flex beam (e.g., the flex beam 102 of FIG. 1). The independent plates 200 of FIG. 2 include a first plate 202 (e.g., an upper plate), a second plate 204 (e.g., a central plate), and a third plate 206 (e.g., a lower plate). The first plate 202 of FIG. 2 has a first end 208 and a second end 210 located opposite the first end 208. The second plate 204 of FIG. 2 has a first end 212 and a second end 214 located opposite the first end 212. The third plate 206 of FIG. 2 has a first end 216 and a second end 218 located opposite the first end 216. As shown in FIG. 2, the first end 212 of the second plate 204 is aligned with the first end 208 of the first plate 202, and the second end 214 of the second plate 204 extends past the second end 210 of the first plate 202. As further shown in FIG. 2, the first end 216 of the third plate 206 is aligned with the first end 212 of the second plate 204, and the second end 218 of the third plate 206 extends past the second end 214 of the second plate 204.

The independent plates 200 of FIG. 2 have several disadvantages when implemented as a flex beam to couple a rotor blade to a rotor hub. For example, while the independent plates 200 can provide a relatively high extent and/or degree of flapwise deflection, such deflection often results in undesirable buckling of the first plate 202, the second plate 204, and/or the third plate 206 of the independent plates 200. Another disadvantage is that the independent plates 200 of FIG. 2 lack a shear path between the first plate 202, the second plate 204, and/or the third plate 206. The absence of a shear path results in an insufficient extent and/or degree of rigidity in the independent plates 200, which in turn requires the implementation of shoes, specialized wear surfaces, and/or other additional parts to facilitate the handling of vertical loads via the independent plates 200. Another disadvantage is that the independent plates 200 of FIG. 2 are unable to carry centrifugal loads except through the implementation of inter-plies.

Figure 3:
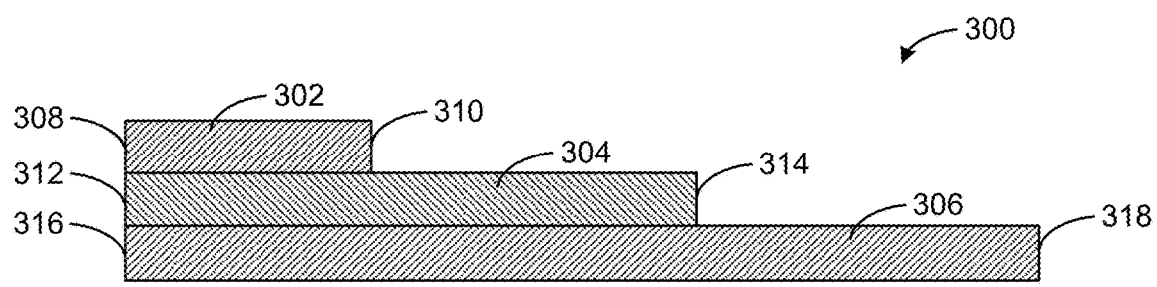
FIG. 3 is a cross-sectional view of a known configuration of unified plates for implementing a flex beam.

As another example, FIG. 3 is a cross-sectional view of a known configuration of unified plates 300 for implementing a flex beam (e.g., the flex beam 102 of FIG. 1). The unified plates 300 of FIG. 3 include a first plate 302 (e.g., an upper plate), a second plate 304 (e.g., a central plate), and a third plate 306 (e.g., a lower plate). The first plate 302 of FIG. 3 has a first end 308 and a second end 310 located opposite the first end 308. The second plate 304 of FIG. 3 has a first end 312 and a second end 314 located opposite the first end 312. The third plate 306 of FIG. 3 has a first end 316 and a second end 318 located opposite the first end 316. As shown in FIG.

3, the first end 312 of the second plate 304 is aligned with the first end 308 of the first plate 302, and the second end 314 of the second plate 304 extends past the second end 310 of the first plate 302. As further shown in FIG. 3, the first end 316 of the third plate 306 is aligned with the first end 312 of the second plate 304, and the second end 318 of the third plate 306 extends past the second end 314 of the second plate 304.

Like the independent plates 200 of FIG. 3, the unified plates 300 of FIG. 3 also have disadvantages when implemented as a flex beam to couple a rotor blade to a rotor hub. For example, while the unified plates 300 of FIG. 3 provide a rigid shear path between the first plate 302, the second plate 304, and/or the third plate 306, the unified plates 300 provide a far lower extent and/or degree of flapwise deflection relative to that attainable via the independent plates 200 of FIG. 2 described above.

The structurally tunable cores disclosed herein facilitate a newly-attainable design space that enables the fabrication of components and/or structures (e.g., aircraft components and/or structures) which can be tuned, configured, customized and/or optimized based on desired operational capabilities (e.g., stiffnesses, deflections, etc.). Unlike the components of the known flex beam designs described above, the structurally tunable cores disclosed herein can be used to implement flex beams that advantageously enable a relatively high degree and/or extent of vertical deflection (flapping) to be attained while maintaining adequate chordwise and spanwise stiffnesses. The increased degree and/or extent of vertical deflection provided by the disclosed structurally tunable cores advantageously reduces the degree and/or extent of drag associated with the aircraft rotor (e.g., drag associated with the rotating blades of the aircraft rotor), and also advantageously reduces the degree and/or extent of maintenance associated with the aircraft rotor. The disclosed structurally tunable cores can advantageously be implemented in a variety of components and/or structures including, for example, the flex beams, the hybrid elastomeric bearings, and the non-pneumatic tires disclosed herein.

Figure 4:
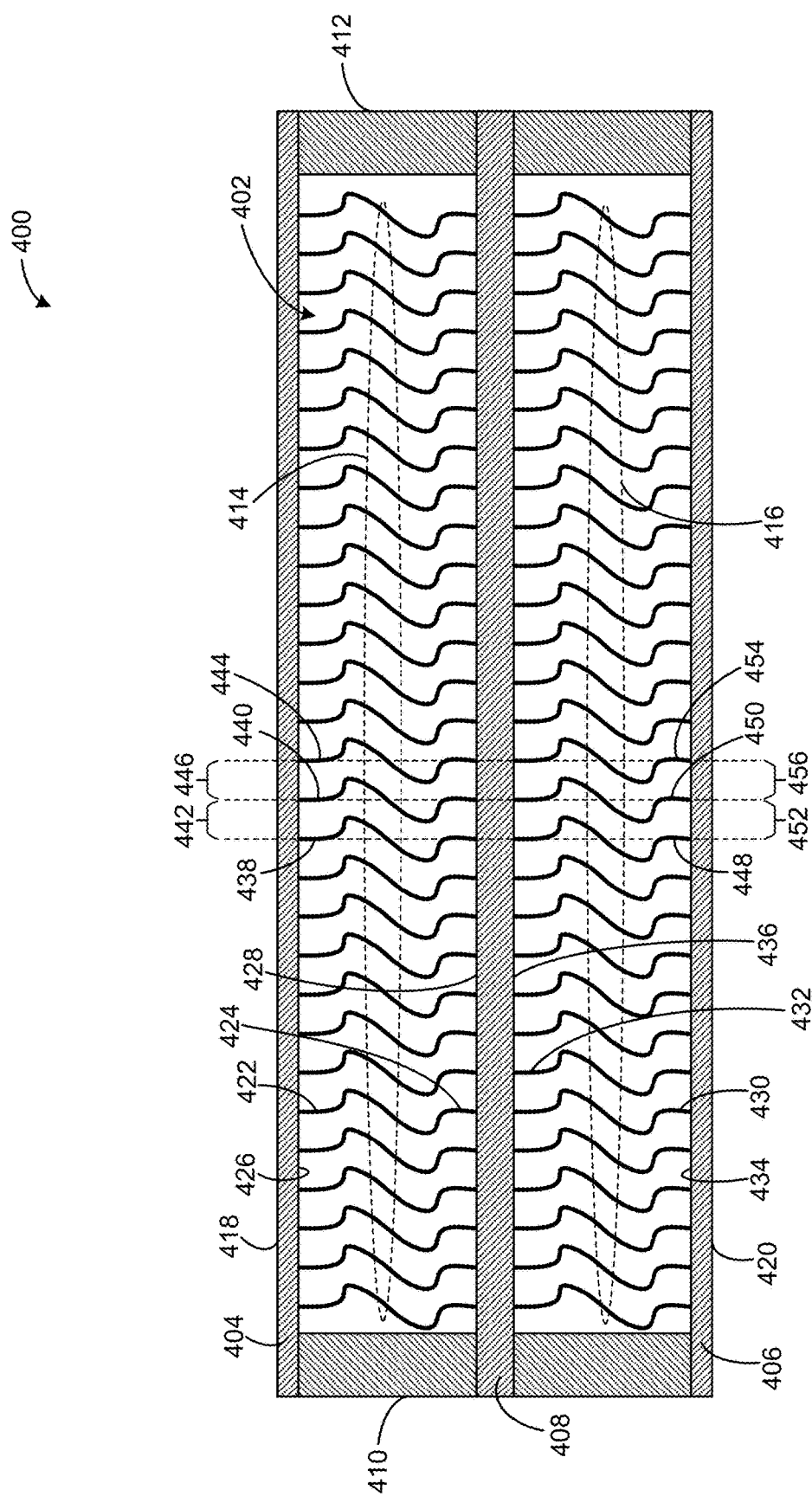
FIG. 4 is a cross-sectional view of an example flex beam including an example structurally tunable core configured in an example first configuration.
Figure 5:
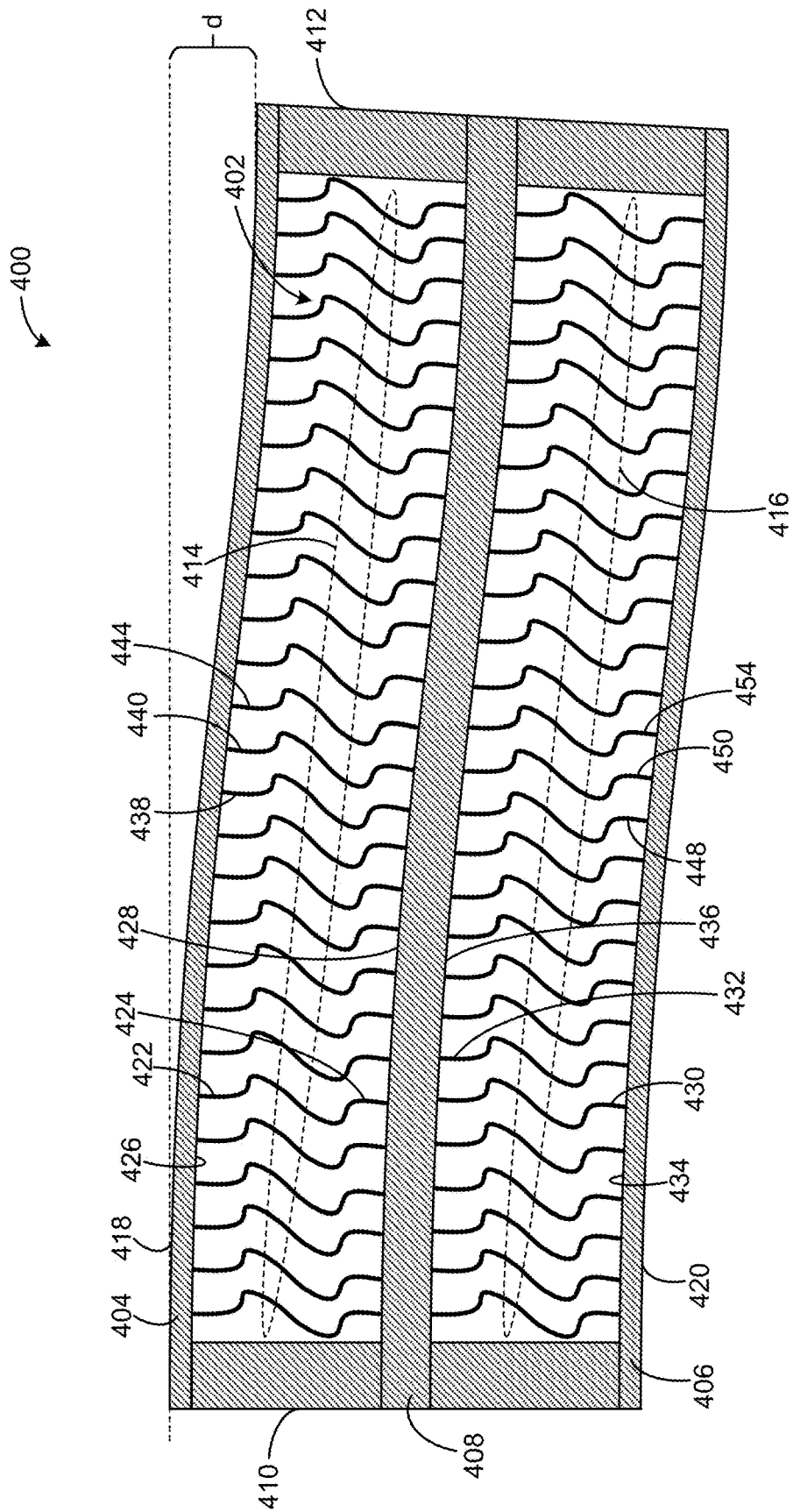
FIG. 5 is a cross-sectional view of the example flex beam of FIG. 4 in a deflected position.

FIG. 4 is a cross-sectional view of an example flex beam 400 including an example structurally tunable core 402 configured in an example first configuration. In the illustrated example of FIG. 4, the structurally tunable core 402 and/or, more generally, the flex beam 400 is shown in an example neutral position. FIG. 5 is a cross-sectional view of the example flex beam of FIG. 4 in an example deflected position. The flex beam 400 is movable (e.g., deflectable and/or deformable) between the example neutral position shown in FIG. 4 and the example deflected position shown in FIG. 5. The flex beam 400 of FIGS. 4 and 5 can be implemented as a mechanism to couple a rotor blade to a rotor hub (e.g., to couple the rotor blade 104 of FIG. 1 to the rotor hub 106 of FIG. 1).

In the illustrated example of FIGS. 4 and 5, the flex beam 400 includes an example first composite laminate 404, an example second composite laminate 406, an example third composite laminate 408, an example first end 410, an example second end 412, and the structurally tunable core 402. The structurally tunable core 402 includes example first resilient core members 414 and example second resilient core members 416. In other examples, the structurally tunable core 402 of FIGS. 4 and 5 can include fewer or additional sets of the resilient core members, and the flex beam 400 of FIGS. 4 and 5 can include fewer or additional ones of the composite laminates.

In the illustrated example of FIGS. 4 and 5, the first composite laminate 404 forms an example first skin 418 (e.g., an upper skin) of the flex beam 400. The second composite laminate 406 is located opposite the first composite laminate 404 and forms an example second skin 420 (e.g., a lower skin) of the flex beam 400. The third composite laminate 408 is located between the first composite laminate 404 and the second composite laminate 406. The second end 412 of the flex beam 400 of FIGS. 4 and 5 is located opposite the first end 410 of the flex beam 400. The first composite laminate 404, the second composite laminate 406, and the third composite laminate 408 of the flex beam 400 of FIGS. 4 and 5 respectively extend from the first end 410 of the flex beam 400 to the second end 412 of the flex beam 400.

The first composite laminate 404 and the second composite laminate 406 of the flex beam 400 of FIGS. 4 and 5 are respectively structured, configured and/or arranged to carry bending, chord, and torsional loads associated with the flex beam 400. The third composite laminate 408 of the flex beam 400 of FIGS. 4 and 5 is structured, configured and/or arranged to carry centrifugal loads associated with the flex beam 400. The flex beam 400 of FIGS. 4 and 5 may encounter such bending, chord, torsional and/or centrifugal loads when the flex beam 400 is implemented, for example, as a mechanism to couple a rotor blade to a rotor hub (e.g., to couple the rotor blade 104 of FIG. 1 to the rotor hub 106 of FIG. 1).

In the illustrated example of FIGS. 4 and 5, the first composite laminate 404, the second composite laminate 406, and the third composite laminate 408 are substantially parallel to one another. In other examples, one or more of the first composite laminate 404, the second composite laminate 406, and/or the third composite laminate 408 of the flex beam 400 can be non-parallel and/or arranged at an angle relative to one another. In the illustrated example of FIGS. 4 and 5, the first composite laminate 404, the second composite laminate 406, and the third composite laminate 408 are substantially linear. In other examples, one or more of the first composite laminate 404, the second composite laminate 406, and/or the third composite laminate 408 of the flex beam 400 can include one or more non-linear (e.g., curved) segments.

The structurally tunable core 402 of the flex beam 400 of FIGS. 4 and 5 includes the first resilient core members 414 and the second resilient core members 416. The first resilient core members 414 of the structurally tunable core 402 of FIGS. 4 and 5 respectively extend between the first composite laminate 404 of the flex beam 400 and the third composite laminate 408 of the flex beam 400. Respective ones of the first resilient core members 414 are spaced apart from one another in a direction extending between the first end 410 and the second end 412 of the flex beam 400. The second resilient core members 416 of the structurally tunable core 402 of FIGS. 4 and 5 respectively extend between the second composite laminate 406 of the flex beam 400 and the third composite laminate 408 of the flex beam 400. Respective ones of the second resilient core members 416 are spaced apart from one another in a direction extending between the first end 410 and the second end 412 of the flex beam 400. The third composite laminate 408 of the flex beam 400 of FIGS. 4 and 5 separates and/or spaces apart the second resilient core members 416 from the first resilient core members 414 in a direction extending between the first composite laminate 404 and the second composite laminate 406 of the flex beam 400.

In the illustrated example of FIGS. 4 and 5, each one of the first resilient core members 414 includes an example first end 422 coupled to the first composite laminate 404 of the flex beam 400, and an example second end 424 located opposite the first end 422 and coupled to the third composite laminate 408 of the flex beam 400. In some examples, the first end 422 of each one of the first resilient core members 414 is integrally formed (e.g., as a single-piece, joint-free structure) with the first composite laminate 404. In other examples, the first end 422 of each one of the first resilient core members 414 is coupled to the first composite laminate 404 of the flex beam 400 via a corresponding pi joint (e.g., the pi joint 700 of FIG. 7 described below) located along an example interior surface 426 of the first composite laminate 404. In some such examples, the pi joints are bonded and/or mechanically fastened to the interior surface 426 of the first composite laminate 404. In other such examples, the pi joints are integrally formed with the first composite laminate 404 along the interior surface 426 of the first composite laminate 404.

In some examples, the second end 424 of each one of the first resilient core members 414 is integrally formed (e.g., as a single-piece, joint-free structure) with the third composite laminate 408. In other examples, the second end 424 of each one of the first resilient core members 414 is coupled to the third composite laminate 408 of the flex beam 400 via a corresponding pi joint (e.g., the pi joint 700 of FIG. 7 described below) located along an example first surface 428 (e.g., an upper surface) of the third composite laminate 408. In some such examples, the pi joints are bonded and/or mechanically fastened to the first surface 428 of the third composite laminate 408. In other such examples, the pi joints are integrally formed with the third composite laminate 408 along the first surface 428 of the third composite laminate 408.

In the illustrated example of FIGS. 4 and 5, each one of the second resilient core members 416 includes an example first end 430 coupled to the second composite laminate 406 of the flex beam 400, and an example second end 432 located opposite the first end 430 and coupled to the third composite laminate 408 of the flex beam 400. In some examples, the first end 430 of each one of the second resilient core members 416 is integrally formed (e.g., as a single-piece, joint-free structure) with the second composite laminate 406. In other examples, the first end 430 of each one of the second resilient core members 416 is coupled to the second composite laminate 406 of the flex beam 400 via a corresponding pi joint (e.g., the pi joint 700 of FIG. 7 described below) located along an example interior surface 434 of the second composite laminate 406. In some such examples, the pi joints are bonded and/or mechanically fastened to the interior surface 434 of the second composite laminate 406. In other such examples, the pi joints are integrally formed with the second composite laminate 406 along the interior surface 434 of the second composite laminate 406.

In some examples, the second end 432 of each one of the second resilient core members 416 is integrally formed (e.g., as a single-piece, joint-free structure) with the third composite laminate 408. In other examples, the second end 432 of each one of the second resilient core members 416 is coupled to the third composite laminate 408 of the flex beam 400 via a corresponding pi joint (e.g., the pi joint 700 of FIG. 7 described below) located along an example second surface 436 (e.g., a lower surface) of the third composite laminate 408, wherein the second surface 436 of the third composite laminate 408 is located opposite the first surface 428 (e.g., the upper surface) of the third composite laminate 408. In some such examples, the pi joints are bonded and/or mechanically fastened to the second surface 436 of the third composite laminate 408. In other such examples, the pi joints are integrally formed (e.g., as a single-piece, joint-free structure) with the third composite laminate 408 along the second surface 436 of the third composite laminate 408.

Figure 6:
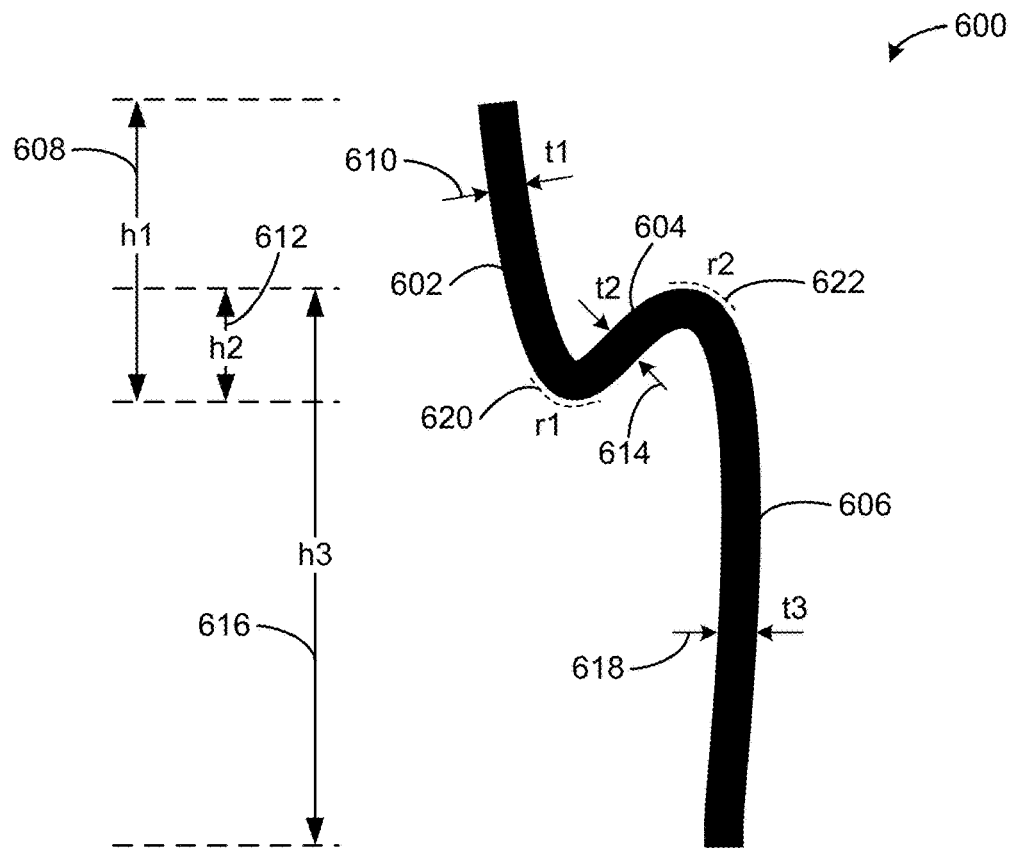
FIG. 6 is a cross-sectional side view of an example resilient core base element that is structurally tunable.

FIG. 6 is a cross-sectional side view of an example resilient core base element 600 that is structurally tunable. The resilient core base element 600 of FIG. 6 can be used to implement one or more portion(s) and/or the entirety of any of the first resilient core member(s) 414 and/or any of the second resilient core member(s) 416 of the structurally tunable core 402 of FIGS. 4 and 5. The resilient core base element 600 of FIG. 6 can be formed from any type(s) of material(s) (e.g., metals, plastics, composites, etc.) that enable the fabricated resilient core base member to have resilient (e.g., spring-like) deflection properties. As further described below, the profile of the resilient core base element 600 of FIG. 6 is generally S-shaped. In other examples, the profile of the resilient core base element 600 may be of a different shape relative to that shown in FIG. 6 including, for example, O-shaped, A-shaped, circular, elliptical, triangular, etc. The profile of the resilient core base element 600 may be configured (e.g., sized and/or shaped) in any manner that enables the fabricated resilient core base member 600 to have resilient (e.g., spring-like) deflection properties.

In the illustrated example of FIG. 6, the resilient core base element 600 includes an example first segment 602, an example second segment 604, and an example third segment 606. The first segment 602 of FIG. 6 has an example first height 608 and an example first thickness 610. The second segment 604 of FIG. 6 has an example second height 612 and an example second thickness 614. The third segment 606 of FIG. 6 has an example third height 616 and an example third thickness 618. The second segment 604 extends from the first segment 602 in a first direction defined by an example first radius of curvature 620 between the first segment 602 and the second segments 604. The third segment 606 extends from the second segment 604 in a second direction defined by an example second radius of curvature 622 between the second segment 604 and the third segment 606.

In some examples, the resilient core base element 600 of FIG. 6 is a base construction element that can be duplicated, and/or that can be expanded upon by the introduction of one or more additional segment(s). For example, each one of the first resilient core members 414 of FIGS. 4 and 5 includes a first segment corresponding to the first segment 602 of FIG. 6, a second segment corresponding to the second segment 604 of FIG. 6, a third segment corresponding to the third segment 606 of FIG. 6, a fourth segment extending from the third segment in a third direction defined by a third radius of curvature between the fourth segment and the third segment, and a fifth segment extending from the fourth segment in a fourth direction defined by a fourth radius of curvature between the fifth segment and the fourth segment. Thus, each one of the first resilient core members 414 of FIGS. 4 and 5 is in effect a duplication of the resilient core base element 600 of FIG. 6.

In the illustrated example of FIG. 6, the heights, thicknesses, and radii of curvature associated with the first segment 602, the second segment 604, the third segment 606 and/or, more generally, the resilient core base element 600 define a tunable and/or configurable structural profile of the resilient core base element 600. Respective ones of the heights, the thicknesses, and the radii of curvature of the structural profile of the resilient core base element 600 of FIG. 6 can be individually or collectively configured, tuned and/or tailored to satisfy any one of a plethora of design requirements (e.g., stiffness requirements, deflection requirements, etc.) that may be associated with a particular implementation (e.g., a flex beam implementation).

For example, respective ones of the heights of the resilient core base element 600 of FIG. 6 can be individually or collectively configured. In the illustrated example of FIG. 6, the first height 608 of the first segment 602 is greater than the second height 612 of the second segment 604, the second height 612 of the second segment 604 is less than the third height 616 of the third segment 606, the third height 616 of the third segment 606 is greater than the first height 608 of the first segment 602, and the overall height of the resilient core base element 600 has a first height value. In other examples, the first height 608 is greater than the second height 612, the second height 612 is less than the third height 616, the third height 616 is greater than the first height 608, and the overall height of the resilient core base element 600 has a second height value that is greater than or less than the first height value. In other examples, the respective relationships between and/or among one or more of the first height 608, the second height 612 and/or the third height 616 can differ relative to the relationships shown in FIG. 6 and described above. In some examples, one or more of the first height 608, the second height 612 and/or the third height 616 can be substantially uniform (e.g., substantially equal to one another).

As another example, respective ones of the thicknesses of the resilient core base element 600 of FIG. 6 can be individually or collectively configured. In the illustrated example of FIG. 6, the first thickness 610 of the first segment 602, the second thickness 614 of the second segment 604, and the third thickness 618 of the third segment 606 are substantially uniform (e.g., substantially equal to one another) and have a first thickness value. In other examples, the first thickness 610, the second thickness 614, and the third thickness 618 can be substantially uniform (e.g., substantially equal to one another) and have a second thickness value that is greater than or less than the first thickness value. In still other examples, one or more of the first thickness 610, the second thickness 614, and/or the third thickness 618 can have a first thickness value that differ(s) from a second thickness value of one or more other one(s) of the first thickness 610, the second thickness 614, and/or the third thickness 618.

As another example, respective ones of the radii of curvature between the segments of the resilient core base element 600 of FIG. 6 can be individually or collectively configured. In the illustrated example of FIG. 6, the first radius of curvature 620 between the first segment 602 and the second segment 604, and the second radius of curvature 622 between the second segment 604 and the third segment 606 are substantially uniform (e.g., substantially equal to one another) and have a first radius of curvature value. In other examples, the first radius of curvature 620 and the second radius of curvature 622 can be substantially uniform (e.g., substantially equal to one another) and have a second radius of curvature value that is greater than or less than the first radius of curvature value. In still other examples, the first radius of curvature 620 can have a first radius of curvature value that differs from a second radius of curvature value of the second radius of curvature 622.

As another example, respective ones of the widths of the segments of the resilient core base element 600 of FIG. 6 can be individually or collectively configured. For example, a first width of the first segment 602, a second width of the second segment 604, and a third width of the third segment 606 can be substantially uniform (e.g., substantially equal to one another) and have a first width value. In other examples, the first width, the second width, and the third width can be substantially uniform (e.g., substantially equal to one another) and have a second width value that is greater than or less than the first width value. In still other examples, one or more of the first width, the second width, and/or the third width can have a first width value that differ(s) from a second width value of one or more other one(s) of the first width, the second width, and/or the third width.

The highly-tunable and/or highly-configurable nature of the resilient core base element 600 of FIG. 6 advantageously expands the design space for flex beams relative to the known flex beam designs of FIGS. 2 and 3 described above. For example, known flex beam design techniques commonly involve stacking worst-case flight loads on top of worst-case environmental conditions on top of worst-case material allowables, etc., and then searching for higher strain or higher strength materials to design for such conservatisms and/or requirements in order to prove the safety and/or efficacy of a proposed design. In some instances, suitable materials either do not yet exist or would be too cost prohibitive to manufacture. By contrast, the resilient core base element 600 of FIG. 6 introduces a host of tailorable, tunable and/or configurable design variables (e.g., heights, thicknesses, radii of curvature, widths, etc.) that aid in designing around inherent material issues such as the ability to withstand tension and shear loads, the ability to flex without breaking down in an ultra-high cycle fatigue environment, the ability to withstand heat, etc.

Figure 7:
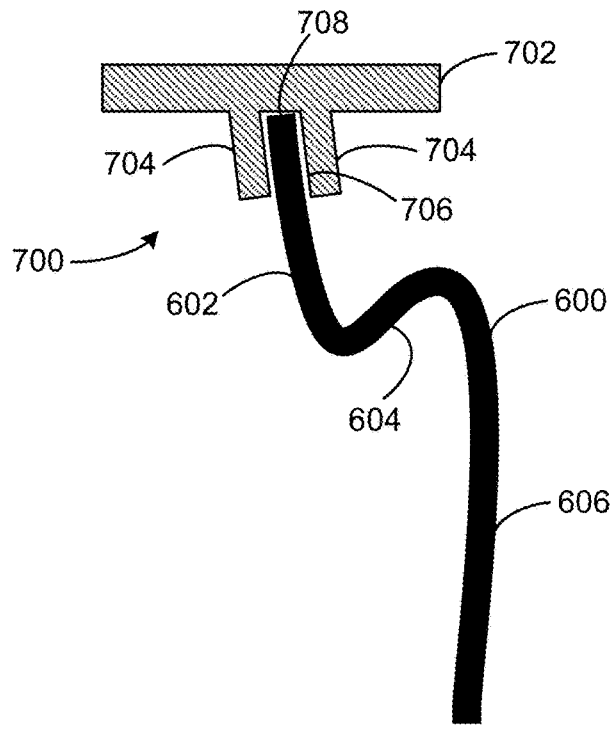
FIG. 7 is a cross-sectional view of the example resilient core base element of FIG. 6 coupled to an example pi joint.

FIG. 7 is a cross-sectional view of the example resilient core base element 600 of FIG. 6 coupled to an example pi joint 700. In the illustrated example of FIG. 7, the pi joint 700 includes an example base 702, and further includes example arms 704 extending at an angle from the base 702 and forming an example slot 706. As shown in FIG. 7, the slot 706 of the pi joint 700 is configured (e.g., sized, shaped and/or arranged) to receive an example end 708 of the resilient core base element 600 to couple the resilient core base element 600 to the pi joint 700 and/or to a structure to which the pi joint 700 is coupled. In some examples, the base 702 of the pi joint 700 can be bonded and/or mechanically fastened to another structure (e.g., the first composite laminate 404, the second composite laminate 406, or the third composite laminate 408 of FIGS. 4 and 5, etc.). In other such examples, the base 702 and/or, more generally, the pi joint 700 can be integrally formed with another structure (e.g., the first composite laminate 404, the second composite laminate 406, or the third composite laminate 408 of FIGS. 4 and 5, etc.).

Returning to the illustrated example of FIGS. 4 and 5, respective ones of the first resilient core members 414 of the structurally tunable core 402 have corresponding respective first structural profiles including first heights, first thicknesses, and first radii of curvature. Respective ones of the second resilient core members 416 of the structurally tunable core 402 have corresponding respective second structural profiles including second heights, second thicknesses, and second radii of curvature. In the illustrated example of FIGS. 4 and 5, the structurally tunable core 402 is shown configured in a first configuration.

In the first configuration of the structurally tunable core 402 shown in FIGS. 4 and 5, respective ones of the first resilient core members 414 are uniformly spaced apart from one another moving from the first end 410 toward the second end 412 of the flex beam 400. For example, an example first one 438 of the first resilient core members 414 is separated from an example second one 440 of the first resilient core members 414 by an example first distance 442, and the second one 440 of the first resilient core members 414 is separated from an example third one 444 of the first resilient core members 414 by an example second distance 446 that is equal to the first distance 442.

In the first configuration of the structurally tunable core 402 shown in FIGS. 4 and 5, respective ones of the second resilient core members 416 are also uniformly spaced apart from one another moving from the first end 410 toward the second end 412 of the flex beam 400. For example, an example first one 448 of the second resilient core members 416 is separated from an example second one 450 of the second resilient core members 416 by an example third distance 452, and the second one 450 of the second resilient core members 416 is separated from an example third one 454 of the second resilient core members 416 by an example fourth distance 456 that is equal to the third distance 452. In the first configuration of the structurally tunable core 402 shown in FIGS. 4 and 5, the first distance 442, the second distance 446, the third distance 452, and the fourth distance 456 are equal to one another. In other examples and/or configurations of the structurally tunable core 402, the second distance 446 can be equal to the first distance 442, the fourth distance 456 can be equal to the third distance 452, and the third distance 452 can differ from the first distance 442.

In the first configuration of the structurally tunable core 402 shown in FIGS. 4 and 5, the first structural profiles of the first resilient core members 414 are uniform relative to one another, the second structural profiles of the second resilient core members 416 are uniform relative to one another, and the second structural profiles of the second resilient core members 416 match (e.g., are the same as) the first structural profiles of the first resilient core members 414. Thus, each one of the first resilient core members 414 and each one of the second resilient core members 416 of the structurally tunable core 402 of FIGS. 4 and 5 has a structural profile that includes matching (e.g., same) heights, thicknesses, and radii of curvature relative to other ones of the first resilient core members 414 and/or other ones of the second resilient core members 416 of the structurally tunable core 402. In other examples and/or configurations of the structurally tunable core 402, respective ones of the first resilient core members 414 can have differing and/or varying first structural profiles relative to one another, respective ones of the second resilient core members 416 can have differing and/or varying second structural profiles relative to one another, and/or respective ones of the second resilient core members 416 can have uniform second structural profiles that differ and/or vary relative to uniform first structural profiles of respective ones of the first resilient core members 414.

Figure 8:
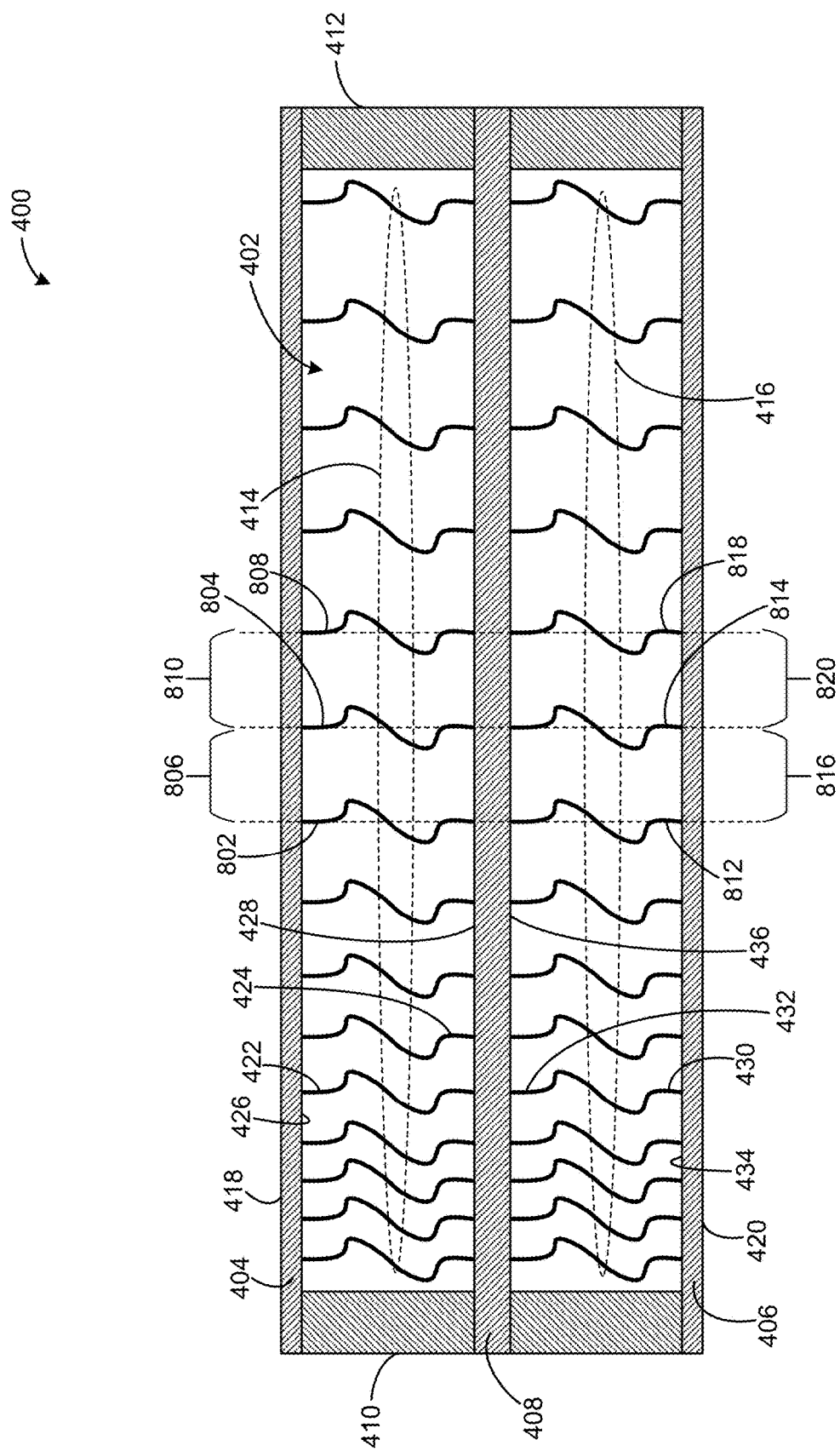
FIG. 8 is a cross-sectional view of the example flex beam of FIGS. 4 and 5 including the example structurally tunable core of FIGS. 4 and 5 configured in an example second configuration.

FIG. 8 is a cross-sectional view of the example flex beam 400 of FIGS. 4 and 5 including the example structurally tunable core 402 of FIGS. 4 and 5 configured in an example second configuration. In the second configuration of the structurally tunable core 402 shown in FIG. 8, respective ones of the first resilient core members 414 are spaced apart from one another by a gradually increasing distance moving from the first end 410 toward the second end 412 of the flex beam 400. For example, an example first one 802 of the first resilient core members 414 is separated from an example second one 804 of the first resilient core members 414 by an example first distance 806, and the second one 804 of the first resilient core members 414 is separated from an example third one 808 of the first resilient core members 414 by an example second distance 810 that is greater than the first distance 806.

In the second configuration of the structurally tunable core 402 shown in FIG. 8, respective ones of the second resilient core members 416 are also spaced apart from one another by a gradually increasing distance moving from the first end 410 toward the second end 412 of the flex beam 400. For example, an example first one 812 of the second resilient core members 416 is separated from an example second one 814 of the second resilient core members 416 by an example third distance 816, and the second one 814 of the second resilient core members 416 is separated from an example third one 818 of the second resilient core members 416 by an example fourth distance 820 that is greater than the third distance 816. In the second configuration of the structurally tunable core 402 shown in FIG. 8, the third distance 816 is equal to the first distance 806, and the fourth distance 820 is equal to the second distance 810. In other examples and/or configurations of the structurally tunable core 402, the third distance 816 can differ from the first distance 806, and/or the fourth distance 820 can differ from the second distance 810.

In the second configuration of the structurally tunable core 402 shown in FIG. 8, the first structural profiles of the first resilient core members 414 are uniform relative to one another, the second structural profiles of the second resilient core members 416 are uniform relative to one another, and the second structural profiles of the second resilient core members 416 match (e.g., are the same as) the first structural profiles of the first resilient core members 414. Thus, each one of the first resilient core members 414 and each one of the second resilient core members 416 of the structurally tunable core 402 of FIG. 8 has a structural profile that includes matching (e.g., same) heights, thicknesses, and radii of curvature relative to other ones of the first resilient core members 414 and/or other ones of the second resilient core members 416 of the structurally tunable core 402. In other examples and/or configurations of the structurally tunable core 402, respective ones of the first resilient core members 414 can have differing and/or varying first structural profiles relative to one another, respective ones of the second resilient core members 416 can have differing and/or varying second structural profiles relative to one another, and/or respective ones of the second resilient core members 416 can have uniform second structural profiles that differ and/or vary relative to uniform first structural profiles of respective ones of the first resilient core members 414.

Figure 9:
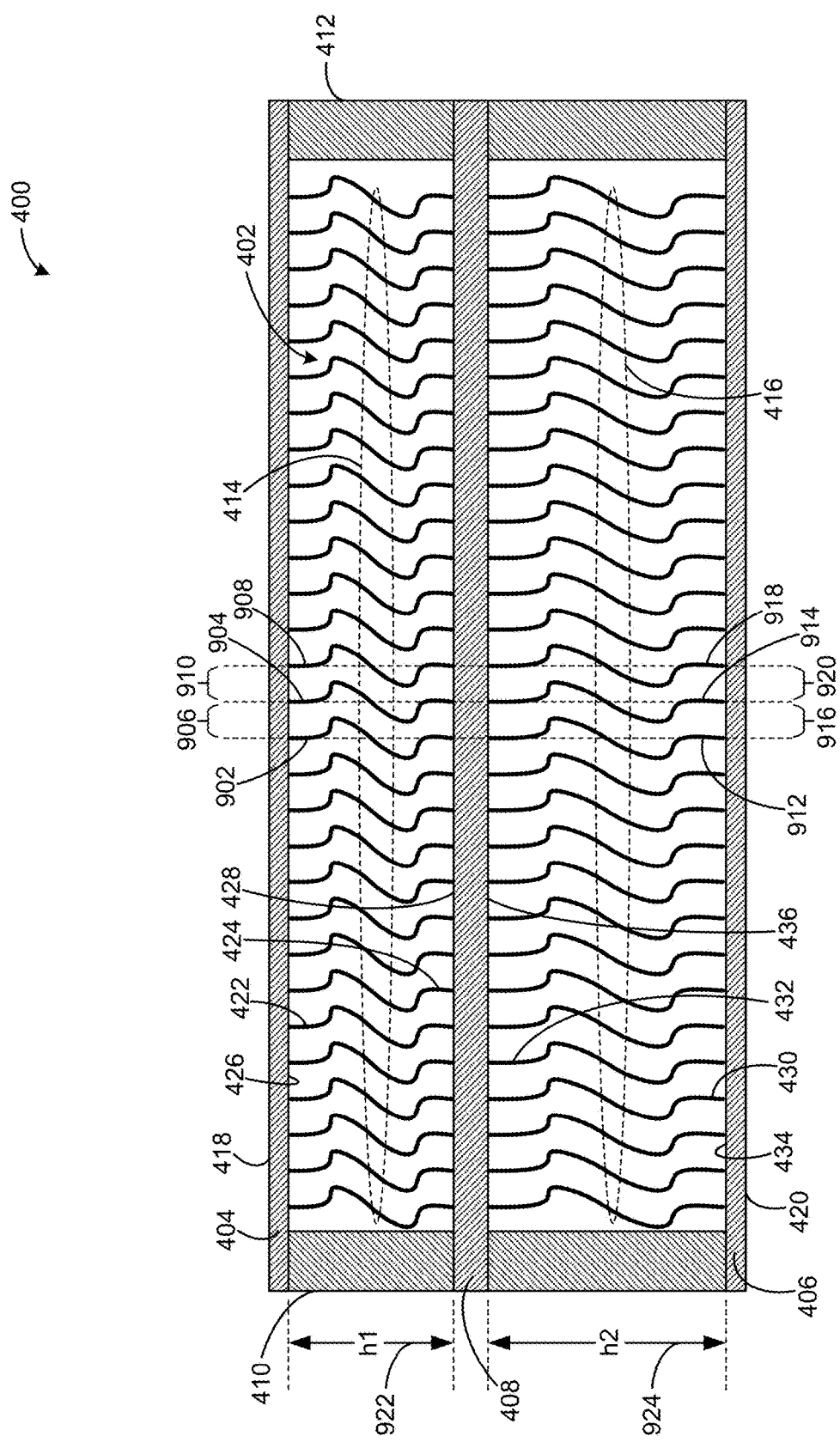
FIG. 9 is a cross-sectional view of the example flex beam of FIGS. 4, 5 and 8 including the example structurally tunable core of FIGS. 4, 5 and 8 configured in an example third configuration.

FIG. 9 is a cross-sectional view of the example flex beam 400 of FIGS. 4, 5 and 8 including the example structurally tunable core 402 of FIGS. 4, 5 and 8 configured in an example third configuration. In the third configuration of the structurally tunable core 402 shown in FIG. 9, respective ones of the first resilient core members 414 are uniformly spaced apart from one another moving from the first end 410 toward the second end 412 of the flex beam 400. For example, an example first one 902 of the first resilient core members 414 is separated from an example second one 904 of the first resilient core members 414 by an example first distance 906, and the second one 904 of the first resilient core members 414 is separated from an example third one 908 of the first resilient core members 414 by an example second distance 910 that is equal to the first distance 906.

In the third configuration of the structurally tunable core 402 shown in FIG. 9, respective ones of the second resilient core members 416 are also uniformly spaced apart from one another moving from the first end 410 toward the second end 412 of the flex beam 400. For example, an example first one 912 of the second resilient core members 416 is separated from an example second one 914 of the second resilient core members 416 by an example third distance 916, and the second one 914 of the second resilient core members 416 is separated from an example third one 918 of the second resilient core members 416 by an example fourth distance 920 that is equal to the third distance 916. In the third configuration of the structurally tunable core 402 shown in FIG. 9, the first distance 906, the second distance 910, the third distance 916, and the fourth distance 920 are equal to one another. In other examples and/or configurations of the structurally tunable core 402, the second distance 910 can be equal to the first distance 906, the fourth distance 920 can be equal to the third distance 916, and the third distance 916 can differ from the first distance 906.

In the third configuration of the structurally tunable core 402 shown in FIG. 9, the first structural profiles of the first resilient core members 414 are uniform relative to one another, the second structural profiles of the second resilient core members 416 are uniform relative to one another, and the second structural profiles of the second resilient core members 416 differ from the first structural profiles of the first resilient core members 414 with regard to height. For example, each one of the first resilient core members 414 of the structurally tunable core 402 of FIG. 9 has a first structural profile that includes matching (e.g., same) heights, thicknesses, and radii of curvature relative to other ones of the first resilient core members 414, and each one of the second resilient core members 416 of the structurally tunable core 402 of FIG. 9 has a second structural profile that includes matching (e.g., same) heights, thicknesses, and radii of curvature relative to other ones of the second resilient core members 416. The first structural profiles of the first resilient core members 414 of FIG. 9 have an example first height 922. The second structural profiles of the second resilient core members 416 of FIG. 9 have an example second height 924 that is greater than the first height 922. In other examples and/or configurations of the structurally tunable core 402, the second height 924 associated with the second structural profiles of the second resilient core members 416 can be less than the first height 922 associated with the first structural profiles of the first resilient core members 414.

Figure 10:
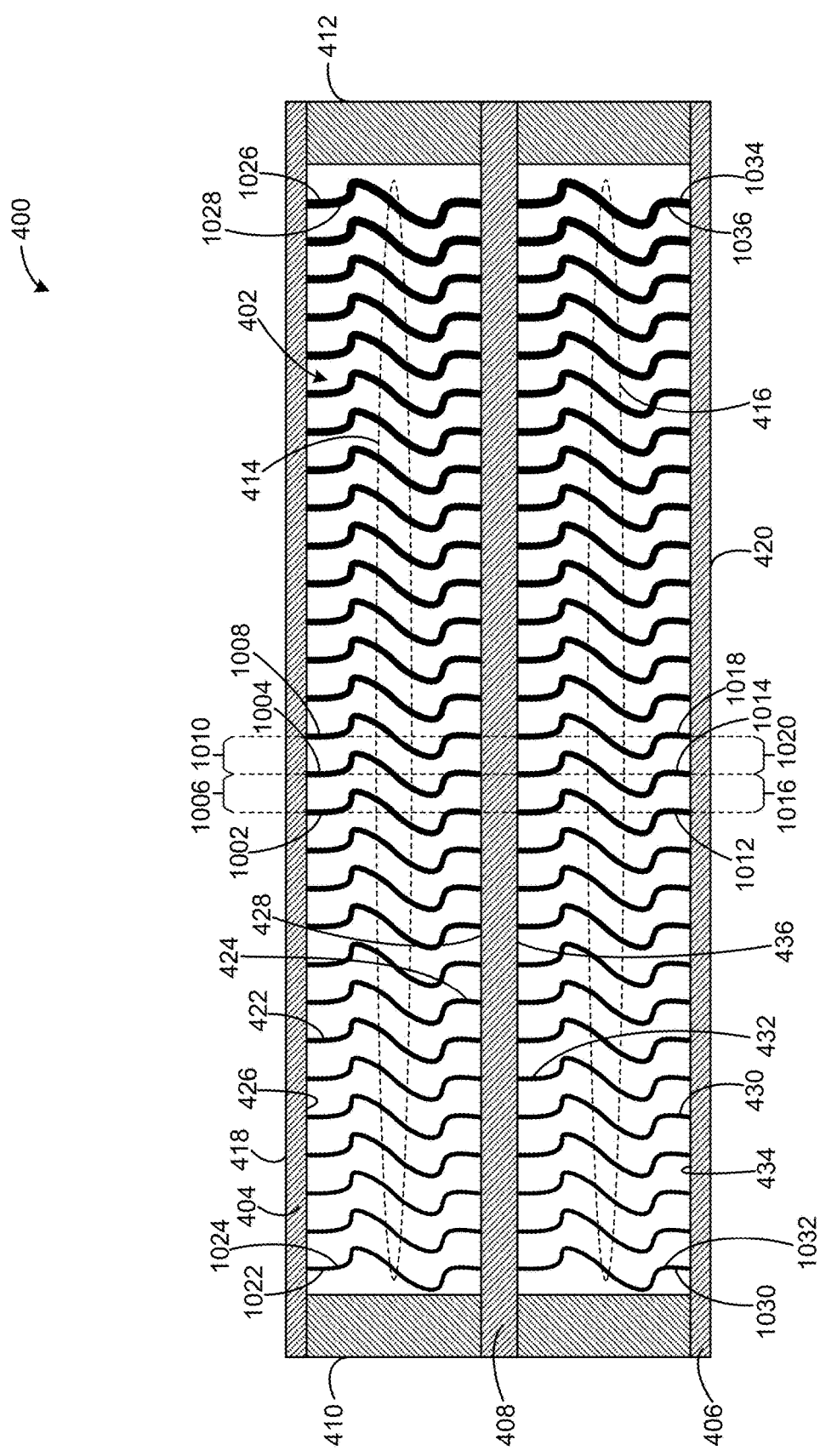
FIG. 10 is a cross-sectional view of the example flex beam of FIGS. 4, 5, 8 and 9 including the example structurally tunable core of FIGS. 4, 5, 8 and 9 configured in an example fourth configuration.

FIG. 10 is a cross-sectional view of the example flex beam 400 of FIGS. 4, 5, 8 and 9 including the example structurally tunable core 402 of FIGS. 4, 5, 8 and 9 configured in an example fourth configuration. In the fourth configuration of the structurally tunable core 402 shown in FIG. 10, respective ones of the first resilient core members 414 are uniformly spaced apart from one another moving from the first end 410 toward the second end 412 of the flex beam 400. For example, an example first one 1002 of the first resilient core members 414 is separated from an example second one 1004 of the first resilient core members 414 by an example first distance 1006, and the second one 1004 of the first resilient core members 414 is separated from an example third one 1008 of the first resilient core members 414 by an example second distance 1010 that is equal to the first distance 1006.

In the fourth configuration of the structurally tunable core 402 shown in FIG. 10, respective ones of the second resilient core members 416 are also uniformly spaced apart from one another moving from the first end 410 toward the second end 412 of the flex beam 400. For example, an example first one 1012 of the second resilient core members 416 is separated from an example second one 1014 of the second resilient core members 416 by an example third distance 1016, and the second one 1014 of the second resilient core members 416 is separated from an example third one 1018 of the second resilient core members 416 by an example fourth distance 1020 that is equal to the third distance 1016. In the fourth configuration of the structurally tunable core 402 shown in FIG. 10, the first distance 1006, the second distance 1010, the third distance 1016, and the fourth distance 1020 are equal to one another. In other examples and/or configurations of the structurally tunable core 402, the second distance 1010 can be equal to the first distance 1006, the fourth distance 1020 can be equal to the third distance 1016, and the third distance 1016 can differ from the first distance 1006.

In the fourth configuration of the structurally tunable core 402 shown in FIG. 10, the first structural profiles of the first resilient core members 414 have a gradually increasing thickness moving from the first end 410 toward the second end 412 of the flex beam 400. For example, an example fourth one 1022 of the first resilient core members 414 of FIG. 10 located proximate the first end 410 of the flex beam 400 has an example first thickness 1024, and an example fifth one 1026 of the first resilient core members 414 of FIG. 10 located proximate the second end 412 of the flex beam 400 has an example second thickness 1028 that is greater than the first thickness 1024. Other ones of the first resilient core members 414 located between the fourth one 1022 and the fifth one 1026 of the first resilient core members 414 of FIG. 10 have corresponding thicknesses that are greater than or equal to the first thickness 1024 and less than or equal to the second thickness 1028. In some examples, the respective thicknesses of such other ones of the first resilient core members 414 gradually and/or continuously increase moving from the fourth one 1022 toward the fifth one 1026 of the first resilient core members 414.

In the fourth configuration of the structurally tunable core 402 shown in FIG. 10, the second structural profiles of the second resilient core members 416 of FIG. 10 also have a gradually increasing thickness moving from the first end 410 toward the second end 412 of the flex beam 400. For example, an example fourth one 1030 of the second resilient core members 416 of FIG. 10 located proximate the first end 410 of the flex beam 400 has an example third thickness 1032, and an example fifth one 1034 of the second resilient core members 416 of FIG. 10 located proximate the second end 412 of the flex beam 400 has an example fourth thickness 1036 that is greater than the third thickness 1032. Other ones of the second resilient core members 416 located between the fourth one 1030 and the fifth one 1034 of the second resilient core members 416 of FIG. 10 have corresponding thicknesses that are greater than or equal to the third thickness 1032 and less than or equal to the fourth thickness 1036. In some examples, the respective thicknesses of such other ones of the second resilient core members 416 gradually and/or continuously increase moving from the fourth one 1030 toward the fifth one 1034 of the second resilient core members 416. In the fourth configuration of the structurally tunable core 402 shown in FIG. 10, the third thickness 1032 is equal to the first thickness 1024, and the fourth thickness 1036 is equal to the second thickness 1028. In other examples and/or configurations of the structurally tunable core 402, the third thickness 1032 can be greater than or less than the first thickness 1024, and/or the fourth thickness 1036 can be greater than or less than the second thickness 1028.

Figure 11:
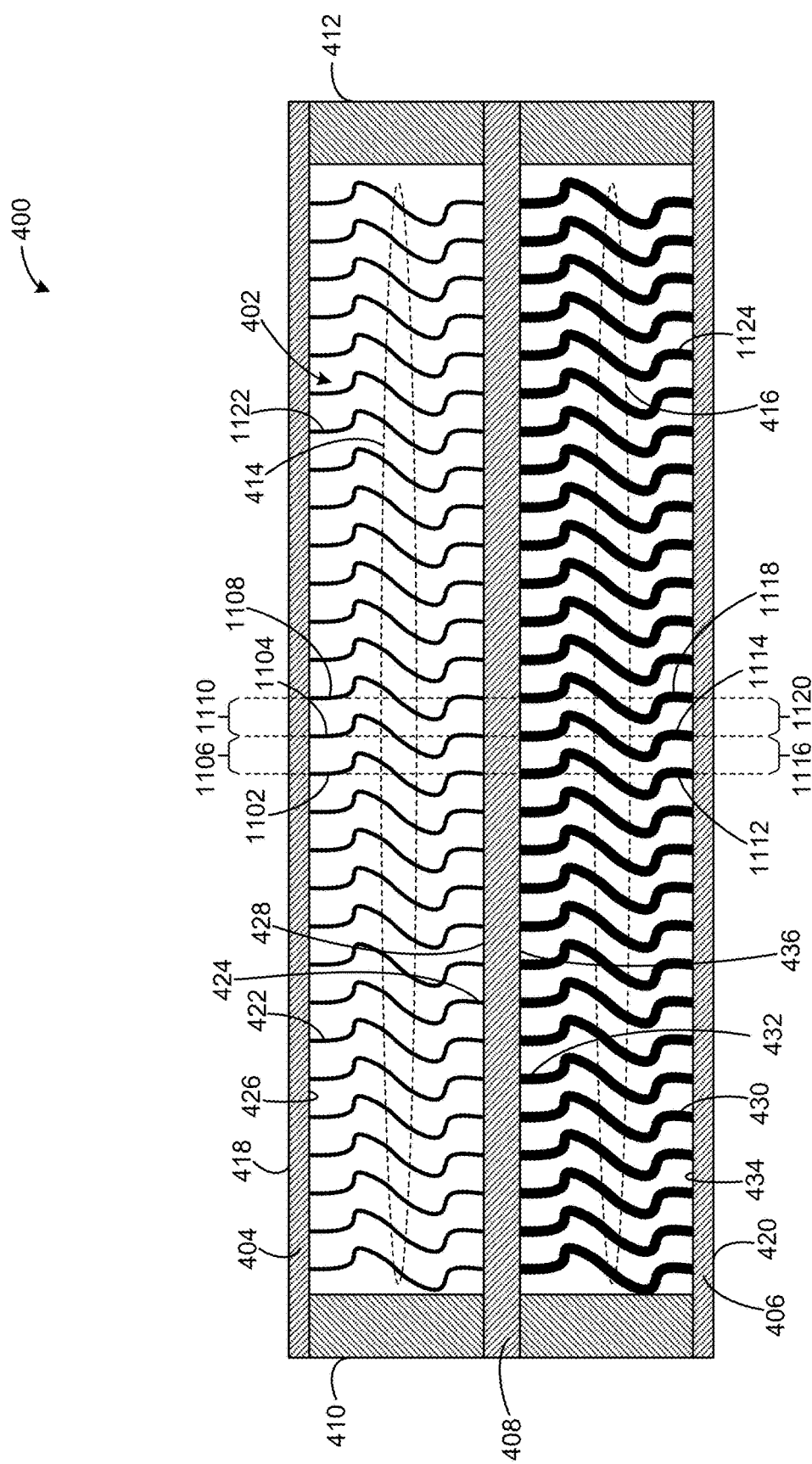
FIG. 11 is a cross-sectional view of the example flex beam of FIGS. 4, 5 and 8-10 including the example structurally tunable core of FIGS. 4, 5 and 8-10 configured in an example fifth configuration.

FIG. 11 is a cross-sectional view of the example flex beam 400 of FIGS. 4, 5 and 8-10 including the example structurally tunable core 402 of FIGS. 4, 5 and 8-10 configured in an example fifth configuration. In the fifth configuration of the structurally tunable core 402 shown in FIG. 11, respective ones of the first resilient core members 414 are uniformly spaced apart from one another moving from the first end 410 toward the second end 412 of the flex beam 400. For example, an example first one 1102 of the first resilient core members 414 is separated from an example second one 1104 of the first resilient core members 414 by an example first distance 1106, and the second one 1104 of the first resilient core members 414 is separated from an example third one 1108 of the first resilient core members 414 by an example second distance 1110 that is equal to the first distance 1106.

In the fifth configuration of the structurally tunable core 402 shown in FIG. 11, respective ones of the second resilient core members 416 are also uniformly spaced apart from one another moving from the first end 410 toward the second end 412 of the flex beam 400. For example, an example first one 1112 of the second resilient core members 416 is separated from an example second one 1114 of the second resilient core members 416 by an example third distance 1116, and the second one 1114 of the second resilient core members 416 is separated from an example third one 1118 of the second resilient core members 416 by an example fourth distance 1120 that is equal to the third distance 1116. In the fifth configuration of the structurally tunable core 402 shown in FIG. 11, the first distance 1106, the second distance 1110, the third distance 1116, and the fourth distance 1120 are equal to one another. In other examples and/or configurations of the structurally tunable core 402, the second distance 1110 can be equal to the first distance 1106, the fourth distance 1120 can be equal to the third distance 1116, and the third distance 1116 can differ from the first distance 1106.

In the fifth configuration of the structurally tunable core 402 shown in FIG. 11, the first structural profiles of the first resilient core members 414 are uniform relative to one another, the second structural profiles of the second resilient core members 416 are uniform relative to one another, and the second structural profiles of the second resilient core members 416 differ from the first structural profiles of the first resilient core members 414 with regard to thickness. For example, each one of the first resilient core members 414 of the structurally tunable core 402 of FIG. 11 has a first structural profile that includes matching (e.g., same) heights, thicknesses, and radii of curvature relative to other ones of the first resilient core members 414, and each one of the second resilient core members 416 of the structurally tunable core 402 of FIG. 11 has a second structural profile that includes matching (e.g., same) heights, thicknesses, and radii of curvature relative to other ones of the second resilient core members 416. The first structural profiles of the first resilient core members 414 of FIG. 11 have an example first thickness 1122. The second structural profiles of the second resilient core members 416 of FIG. 11 have an example second thickness 1124 that is greater than the first thickness 1122. In other examples and/or configurations of the structurally tunable core 402, the second thickness 1124 associated with the second structural profiles of the second resilient core members 416 can be less than the first thickness 1122 associated with the first structural profiles of the first resilient core members 414.

Figure 12:
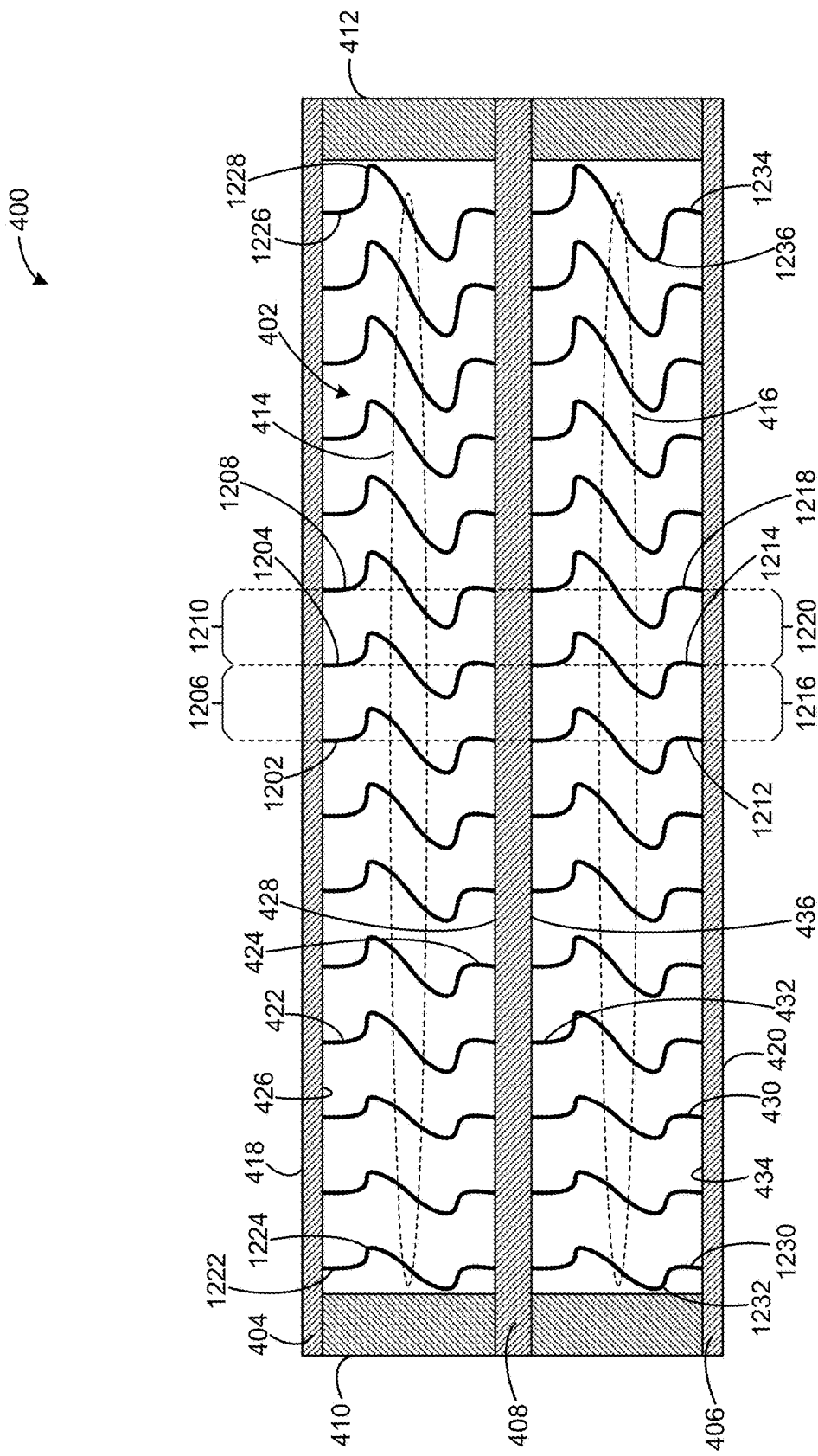
FIG. 12 is a cross-sectional view of the example flex beam of FIGS. 4, 5 and 8-11 including the example structurally tunable core of FIGS. 4, 5 and 8-11 configured in an example sixth configuration.

FIG. 12 is a cross-sectional view of the example flex beam 400 of FIGS. 4, 5 and 8-11 including the example structurally tunable core 402 of FIGS. 4, 5 and 8-11 configured in an example sixth configuration. In the sixth configuration of the structurally tunable core 402 shown in FIG. 12, respective ones of the first resilient core members 414 are uniformly spaced apart from one another moving from the first end 410 toward the second end 412 of the flex beam 400. For example, an example first one 1202 of the first resilient core members 414 is separated from an example second one 1204 of the first resilient core members 414 by an example first distance 1206, and the second one 1204 of the first resilient core members 414 is separated from an example third one 1208 of the first resilient core members 414 by an example second distance 1210 that is equal to the first distance 1206.

In the sixth configuration of the structurally tunable core 402 shown in FIG. 12, respective ones of the second resilient core members 416 are also uniformly spaced apart from one another moving from the first end 410 toward the second end 412 of the flex beam 400. For example, an example first one 1212 of the second resilient core members 416 is separated from an example second one 1214 of the second resilient core members 416 by an example third distance 1216, and the second one 1214 of the second resilient core members 416 is separated from an example third one 1218 of the second resilient core members 416 by an example fourth distance 1220 that is equal to the third distance 1216. In the sixth configuration of the structurally tunable core 402 shown in FIG. 12, the first distance 1206, the second distance 1210, the third distance 1216, and the fourth distance 1220 are equal to one another. In other examples and/or configurations of the structurally tunable core 402, the second distance 1210 can be equal to the first distance 1206, the fourth distance 1220 can be equal to the third distance 1216, and the third distance 1216 can differ from the first distance 1206.

In the sixth configuration of the structurally tunable core 402 shown in FIG. 12, the first structural profiles of the first resilient core members 414 have a gradually decreasing radius of curvature moving from the first end 410 toward the second end 412 of the flex beam 400. For example, an example fourth one 1222 of the first resilient core members 414 of FIG. 12 located proximate the first end 410 of the flex beam 400 has an example first radius of curvature 1224, and an example fifth one 1226 of the first resilient core members 414 of FIG. 12 located proximate the second end 412 of the flex beam 400 has an example second radius of curvature 1228 that is less than the first radius of curvature 1224. Other ones of the first resilient core members 414 located between the fourth one 1222 and the fifth one 1226 of the first resilient core members 414 of FIG. 12 have corresponding radii of curvature that are less than or equal to the first radius of curvature 1224 and greater than or equal to the second radius of curvature 1228. In some examples, the respective radii of curvature of such other ones of the first resilient core members 414 gradually and/or continuously decrease moving from the fourth one 1222 toward the fifth one 1226 of the first resilient core members 414.

In the sixth configuration of the structurally tunable core 402 shown in FIG. 12, the second structural profiles of the second resilient core members 416 also have a gradually decreasing radius of curvature moving from the first end 410 toward the second end 412 of the flex beam 400. For example, an example fourth one 1230 of the second resilient core members 416 of FIG. 12 located proximate the first end 410 of the flex beam 400 has an example third radius of curvature 1232, and an example fifth one 1234 of the second resilient core members 416 of FIG. 12 located proximate the second end 412 of the flex beam 400 has an example fourth radius of curvature 1236 that is less than the third radius of curvature 1232. Other ones of the second resilient core members 416 located between the fourth one 1230 and the fifth one 1234 of the second resilient core members 416 of FIG. 12 have corresponding radii of curvature that are less than or equal to the third radius of curvature 1232 and greater than or equal to the fourth radius of curvature 1236. In some examples, the respective radii of curvature of such other ones of the second resilient core members 416 gradually and/or continuously decrease moving from the fourth one 1230 toward the fifth one 1234 of the second resilient core members 416. In the sixth configuration of the structurally tunable core 402 shown in FIG. 12, the third radius of curvature 1232 is equal to the first radius of curvature 1224, and the fourth radius of curvature 1236 is equal to the second radius of curvature 1228. In other examples and/or configurations of the structurally tunable core 402, the third radius of curvature 1232 can be greater than or less than the first radius of curvature 1224, and/or the fourth radius of curvature 1236 can be greater than or less than the second radius of curvature 1228.

Figure 13:
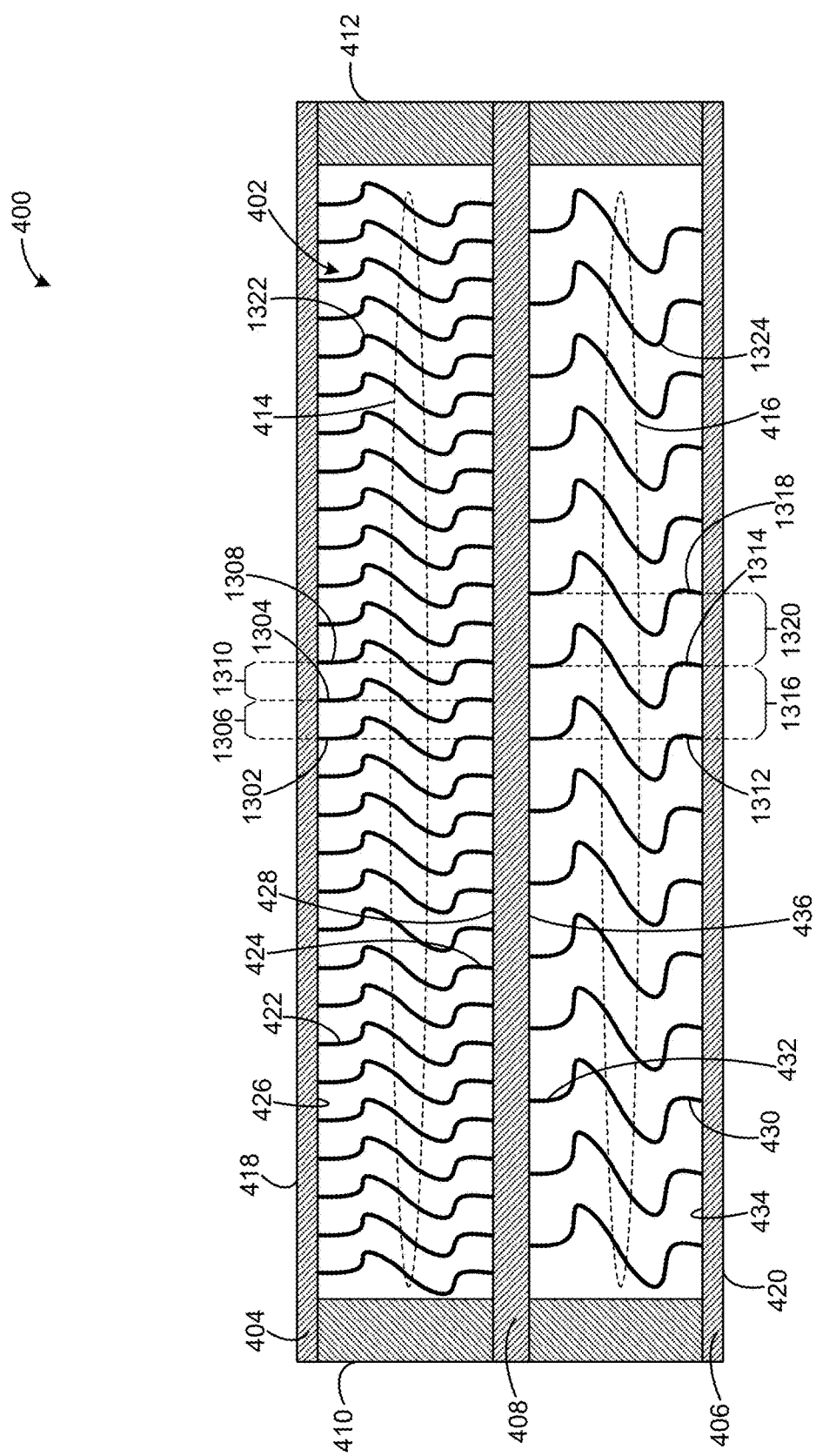
FIG. 13 is a cross-sectional view of the example flex beam of FIGS. 4, 5 and 8-12 including the example structurally tunable core of FIGS. 4, 5 and 8-12 configured in an example seventh configuration.

FIG. 13 is a cross-sectional view of the example flex beam 400 of FIGS. 4, 5 and 8-12 including the example structurally tunable core 402 of FIGS. 4, 5 and 8-12 configured in an example seventh configuration. In the seventh configuration of the structurally tunable core 402 shown in FIG. 13, respective ones of the first resilient core members 414 are uniformly spaced apart from one another moving from the first end 410 toward the second end 412 of the flex beam 400. For example, an example first one 1302 of the first resilient core members 414 is separated from an example second one 1304 of the first resilient core members 414 by an example first distance 1306, and the second one 1304 of the first resilient core members 414 is separated from an example third one 1308 of the first resilient core members 414 by an example second distance 1310 that is equal to the first distance 1306.

In the seventh configuration of the structurally tunable core 402 shown in FIG. 13, respective ones of the second resilient core members 416 are also uniformly spaced apart from one another moving from the first end 410 toward the second end 412 of the flex beam 400. For example, an example first one 1312 of the second resilient core members 416 is separated from an example second one 1314 of the second resilient core members 416 by an example third distance 1316, and the second one 1314 of the second resilient core members 416 is separated from an example third one 1318 of the second resilient core members 416 by an example fourth distance 1320 that is equal to the third distance 1316. In the seventh configuration of the structurally tunable core 402 shown in FIG. 13, the third distance 1316 is greater than the first distance 1306. In other examples and/or configurations of the structurally tunable core 402, the third distance 1316 can be equal to or less than the first distance 1306.

In the seventh configuration of the structurally tunable core 402 shown in FIG. 13, the first structural profiles of the first resilient core members 414 are uniform relative to one another, the second structural profiles of the second resilient core members 416 are uniform relative to one another, and the second structural profiles of the second resilient core members 416 differ from the first structural profiles of the first resilient core members 414 with regard to radius of curvature. For example, each one of the first resilient core members 414 of the structurally tunable core 402 of FIG. 13 has a first structural profile that includes matching (e.g., same) heights, thicknesses, and radii of curvature relative to other ones of the first resilient core members 414, and each one of the second resilient core members 416 of the structurally tunable core 402 of FIG. 13 has a second structural profile that includes matching (e.g., same) heights, thicknesses, and radii of curvature relative to other ones of the second resilient core members 416. The first structural profiles of the first resilient core members 414 of FIG. 13 have an example first radius of curvature 1322. The second structural profiles of the second resilient core members 416 of FIG. 13 have an example second radius of curvature 1324 that is less than the first radius of curvature 1322. In other examples and/or configurations of the structurally tunable core 402, the second radius of curvature 1324 associated with the second structural profiles of the second resilient core members 416 can be greater than the first radius of curvature 1322 associated with the first structural profiles of the first resilient core members 414.

Figure 14:
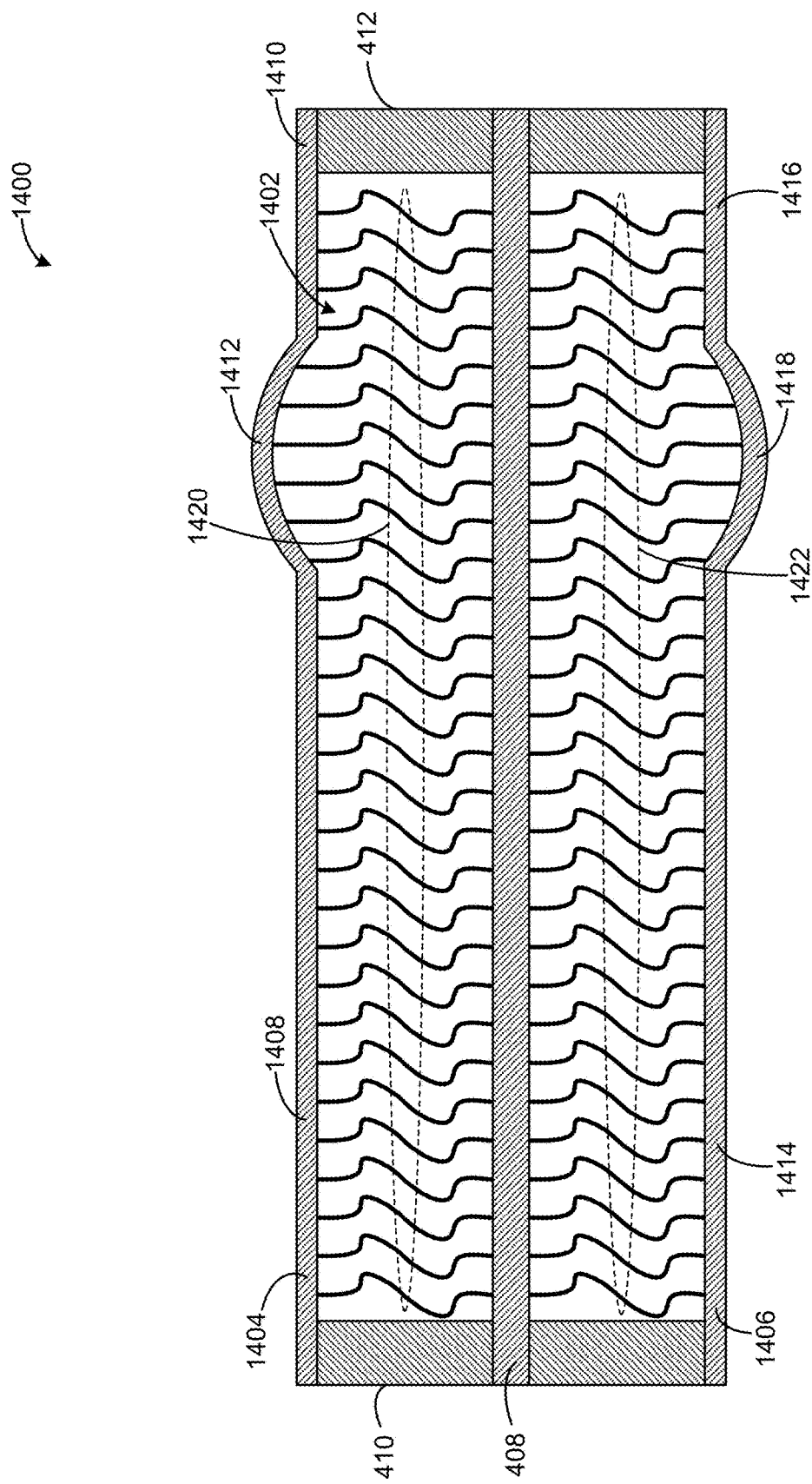
FIG. 14 is a cross-sectional view of a second example flex beam including an example structurally tunable core.

FIG. 14 is a cross-sectional view of a second example flex beam 1400 including an example structurally tunable core 1402. The flex beam 1400 of FIG. 14 includes the third composite laminate 408, the first end 410, and the second end 412 of the flex beam 400 of FIGS. 4 and 5 described above. The flex beam 1400 of FIG. 14 further includes an example first composite laminate 1404 having a modified shape relative to the first composite laminate 404 of the flex beam 400 of FIG. 4, and an example second composite laminate 1406 having a modified shape relative to the second composite laminate 406 of the flex beam 400 of FFIG. 4. For example, unlike the first composite laminate 404 and the second composite laminate 406 of the flex beam 400 of FIG. 4 which respectively have a linear shape, the first composite laminate 1404 and the second composite laminate 1406 of the flex beam 1400 of FIG. 14 respectively have a shape that includes a curvature (e.g., a curved segment).

In the illustrated example of FIG. 14, the first composite laminate 1404 of the flex beam 1400 of FIG. 14 includes an example first linear segment 1408 extending inwardly from the first end 410 of the flex beam 1400, an example second linear segment 1410 extending inwardly from the second end 412 of the flex beam 1400, and an example curved segment 1412 extending between the first linear segment 1408 and the second linear segment 1410 of the first composite laminate 1404. The second composite laminate 1406 of the flex beam 1400 of FIG. 14 includes an example first linear segment 1414 extending inwardly from the first end 410 of the flex beam 1400, an example second linear segment 1416 extending inwardly from the second end 412 of the flex beam 1400, and an example curved segment 1418 extending between the first linear segment 1414 and the second linear segment 1416 of the second composite laminate 1406. In the illustrated example of FIG. 14, the curved segment 1412 of the first composite laminate 1404 has a downwardly-concave shape, and the curved segment 1418 of the second composite laminate 1404 has an upwardly-concave shape. The curved segment 1412 of the first composite laminate 1404 and/or the curved segment 1418 of the second composite laminate 1406 define(s) a bending location of the flex beam 1400 of FIG. 14.

In the illustrated example of FIG. 14, the curved segment 1418 of the second composite laminate 1406 is aligned with (e.g., in vertical alignment with) the curved segment 1412 of the first composite laminate 1404. In other examples, the curved segment 1418 of the second composite laminate 1406 can be offset from (e.g., not vertically aligned with) the curved segment 1412 of the first composite laminate 1404. In the illustrated example of FIG. 14, the first composite laminate 1404 and the second composite laminate 1406 each include a single curved segment. In other examples, the first composite laminate 1404 and/or the second composite laminate 1406 can include a different number (e.g., 0, 2, 3, etc.) of curved segments, including implementations where the number of curved segments included in the first composite laminate 1404 differs from the number of curved segments included in the second composite laminate 1406.

The structurally tunable core 1402 of the flex beam 1400 of FIG. 14 is shown configured in an example first configuration that generally resembles the first configuration of the structurally tunable core 402 of the flex beam 400 of FIG. 4. In other examples, the structurally tunable core 1402 of FIG. 14 can alternatively be configured to generally resemble any of the second, third, fourth, fifth, sixth and/or seventh configurations of the structurally tunable core 402 described above in connection with FIGS. 8-13. In the illustrated example of FIG. 14, the structurally tunable core 1402 includes example first resilient core members 1420 and example second resilient core members 1422.

The first resilient core members 1420 of FIG. 14 generally resemble the first resilient core members 414 of FIG. 4 in terms of the spacing between respective ones of the first resilient core members 1420, and the first structural profiles of the respective ones of the first resilient core members 1420. The first resilient core members 1420 of FIG. 14 differ from the first resilient core members 414 of FIG. 4 in that not all of the first resilient core members 1420 of FIG. 14 are of a uniform height. For example, respective ones of the first resilient core members 1420 of FIG. 4 that are aligned with (e.g., in vertical alignment with) the curved segment 1412 of the first composite laminate 1404 of FIG. 14 have heights that are increased relative to the heights of respective ones of the first resilient core members 1420 of FIG. 4 that are aligned with (e.g., in vertical alignment with) the first linear segment 1408 and/or the second linear segment 1410 of the first composite laminate 1404 of FIG. 14.

Similarly, the second resilient core members 1422 of FIG. 14 generally resemble the second resilient core members 416 of FIG. 4 in terms of the spacing between respective ones of the second resilient core members 1422, and the second structural profiles of the respective ones of the second resilient core members 1422. The second resilient core members 1422 of FIG. 14 differ from the second resilient core members 416 of FIG. 4 in that not all of the second resilient core members 1422 of FIG. 14 are of a uniform height. For example, respective ones of the second resilient core members 1422 of FIG. 4 that are aligned with (e.g., in vertical alignment with) the curved segment 1418 of the second composite laminate 1406 of FIG. 14 have heights that are increased relative to the heights of respective ones of the second resilient core members 1422 of FIG. 4 that are aligned with (e.g., in vertical alignment with) the first linear segment 1414 and/or the second linear segment 1416 of the second composite laminate 1406 of FIG. 14.

Figure 15:
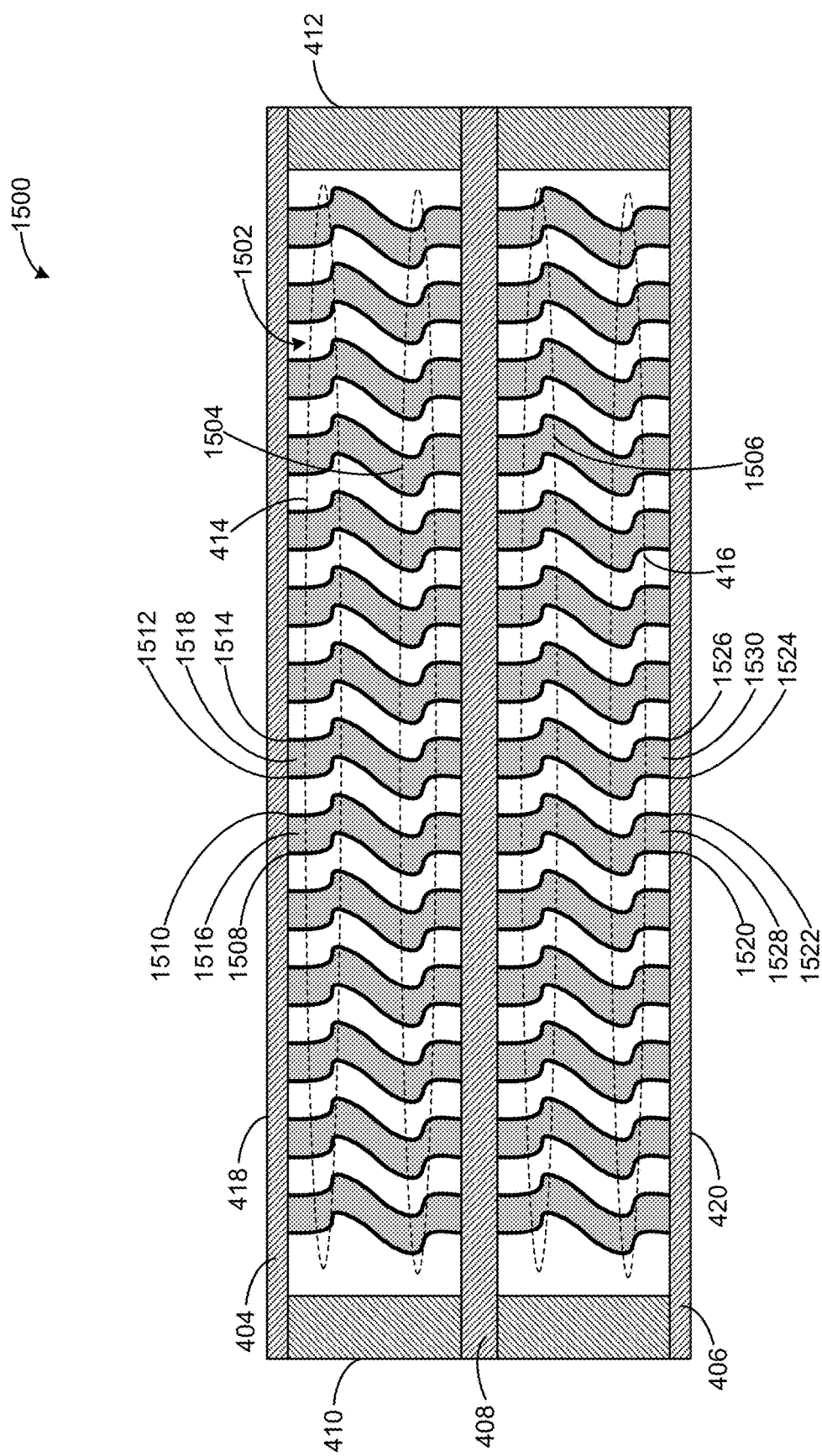
FIG. 15 is a cross-sectional view of a third example flex beam including an example structurally tunable core.

FIG. 15 is a cross-sectional view of a third example flex beam 1500 including an example structurally tunable core 1502. The flex beam 1500 of FIG. 15 includes the first composite laminate 404, the second composite laminate 406, the third composite laminate 408, the first end 410, and the second end 412 of the flex beam 400 of FIGS. 4 and 5 described above. The structurally tunable core 1502 of the flex beam 1500 of FIG. 15 includes the first resilient core members 414 and the second resilient core members 416 of the structurally tunable core 402 of FIGS. 4 and 5 described above.

In the illustrated example of FIG. 15, the structurally tunable core 1502 is shown configured in an example first configuration that matches (e.g., is the same as) the first configuration of the structurally tunable core 402 of FIG. 4 in terms of the spacing between respective ones of the first resilient core members 414, the spacing between respective ones of the second resilient core members 416, the first structural profiles of the respective ones of the first resilient core members 414, and the second structural profiles of the respective ones of the second resilient core members 416. In other examples, the structurally tunable core 1502 of FIG. 15 can alternatively be configured to resemble any of the second, third, fourth, fifth, sixth and/or seventh configurations of the structurally tunable core 402 described above in connection with FIGS. 8-13, and/or to resemble the first configuration of the structurally tunable core 1402 of the flex beam 1400 described above in connection with FIG. 14.

Relative to the structurally tunable core 402 of the flex beam 400 FIG. 4, the structurally tunable core 1502 of the flex beam 1500 of FIG. 15 further includes elastomeric members positioned and/or extending between various neighboring ones of the resilient core members. The elastomeric members of the structurally tunable core 1502 of FIG. 15 provide the flex beam 1500 of FIG. 15 with a dampening capability that is generally absent from the flex beam 400 of FIG. 4.

In the illustrated example of FIG. 15, the structurally tunable core 1502 includes example first elastomeric members 1504 and example second elastomeric members 1506. Respective ones of the first elastomeric members 1504 of FIG. 15 are positioned and/or extend between various neighboring ones of the first resilient core members 414 of the structurally tunable core 1502. For example, an example first one 1508 of the first resilient core members 414 of FIG. 15 is spaced apart from and neighbors an example second one 1510 of the first resilient core members 414, the second one 1510 of the first resilient core members 414 is spaced apart from and neighbors an example third one 1512 of the first resilient core members 414, and the third one 1512 of the first resilient core members 414 is spaced apart from and neighbors an example fourth one 1514 of the first resilient core members 414. An example first one 1516 of the first elastomeric members 1504 is positioned and/or extends between the first one 1508 and the second one 1510 of the first resilient core members 414, and a second one 1518 of the first elastomeric members 1504 is positioned and/or extends between the third one 1512 and the fourth one 1514 of the first resilient core members 414.

In the illustrated example of FIG. 15, the space located between the second one 1510 and the third one 1512 of the first resilient core members 414 of FIG. 15 is unoccupied by any of the first elastomeric members 1504. As further shown in FIG. 15, the respective ones of the first elastomeric members 1504 of FIG. 15 are positioned and/or extend between every second pair of neighboring ones of the first resilient core members 414 of the structurally tunable core 1502. In other examples, the respective ones of the first elastomeric members 1504 of FIG. 15 can be positioned and/or extend between a different interval (e.g., each pair, every third pair, every fourth pair, randomly-located pairs, etc.) of neighboring ones of the first resilient core members 414 of the structurally tunable core 1502.

Respective ones of the second elastomeric members 1506 of FIG. 15 are positioned and/or extend between various neighboring ones of the second resilient core members 416 of the structurally tunable core 1502. For example, an example first one 1520 of the second resilient core members 416 of FIG. 15 is spaced apart from and neighbors an example second one 1522 of the second resilient core members 416, the second one 1522 of the second resilient core members 416 is spaced apart from and neighbors an example third one 1524 of the second resilient core members 416, and the third one 1524 of the second resilient core members 416 is spaced apart from and neighbors an example fourth one 1526 of the second resilient core members 416. An example first one 1528 of the second elastomeric members 1506 is positioned and/or extends between the first one 1520 and the second one 1522 of the second resilient core members 416, and a second one 1530 of the second elastomeric members 1506 is positioned and/or extends between the third one 1524 and the fourth one 1526 of the second resilient core members 416.

In the illustrated example of FIG. 15, the space located between the second one 1522 and the third one 1524 of the second resilient core members 416 of FIG. 15 is unoccupied by any of the second elastomeric members 1506. As further shown in FIG. 15, the respective ones of the second elastomeric members 1506 of FIG. 15 are positioned and/or extend between every second pair of neighboring ones of the second resilient core members 416 of the structurally tunable core 1502. In other examples, the respective ones of the second elastomeric members 1506 of FIG. 15 can be positioned and/or extend between a different interval (e.g., each pair, every third pair, every fourth pair, randomly-located pairs, etc.) of neighboring ones of the second resilient core members 416 of the structurally tunable core 1502. In the illustrated example of FIG. 15, respective ones of the second elastomeric members 1506 of the structurally tunable core 1502 are aligned with (e.g., in vertical alignment with) with respective ones of the first elastomeric members 1504 of the structurally tunable core 1502. In other examples, the second elastomeric members 1506 of the structurally tunable core 1502 can be offset from (e.g., not vertically aligned with) the first elastomeric members 1504 of the structurally tunable core 1502.

Figure 16:
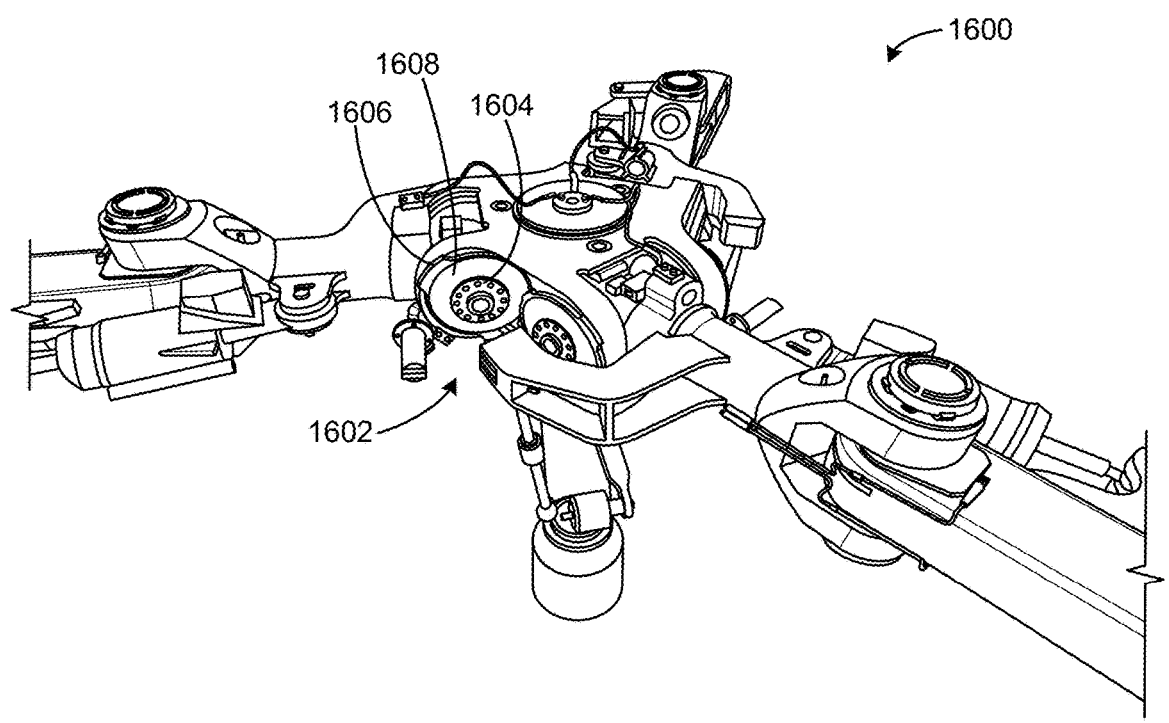
FIG. 16 is a perspective view of a known aircraft rotor having an elastomeric bearing.

FIG. 16 is a perspective view of a known aircraft rotor 1600 having an elastomeric bearing 1602. The elastomeric bearing 1602 of FIG. 16 includes a first annulus 1604 (e.g., an inner annulus), a second annulus 1606 (e.g., an outer annulus) circumscribing the first annulus 1604, and an elastomeric member 1608 that fills the space between the inner annulus 1604 and the outer annulus 1606 of the elastomeric bearing 1602.

Figure 17:
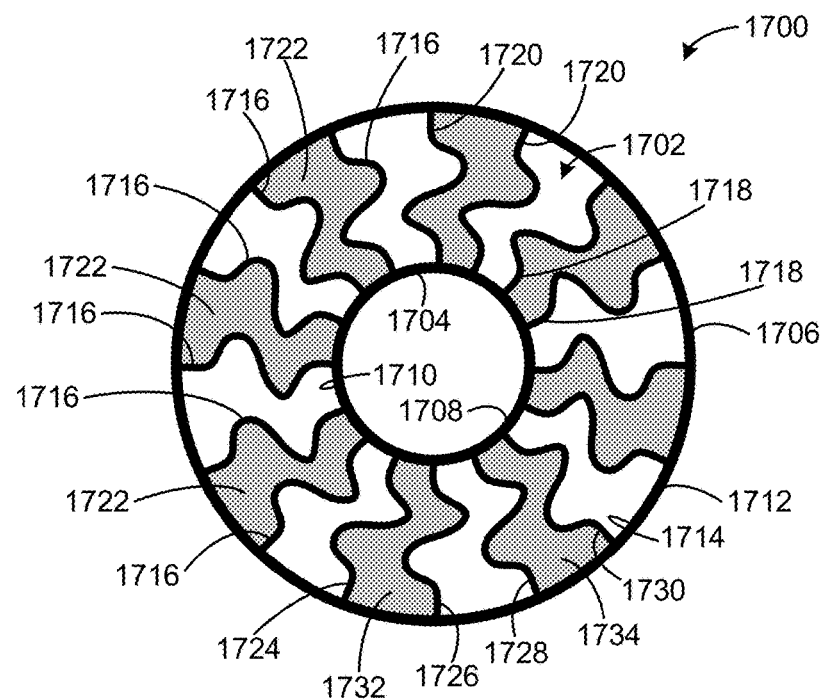
FIG. 17 is a cross-sectional view of an example hybrid elastomeric bearing including an example structurally tunable core.

FIG. 17 is a cross-sectional view of an example hybrid elastomeric bearing 1700 including an example structurally tunable core 1702. The hybrid elastomeric bearing 1700 of FIG. 17 further includes an example first annulus 1704 (e.g., an inner annulus), and an example second annulus 1706 (e.g., an outer annulus) circumscribing the first annulus 1704. The first annulus 1704 of FIG. 17 includes an example inner surface 1708 and an example outer surface 1710 located opposite the inner surface 1708. The second annulus 1706 of FIG. 17 includes an example inner surface 1712 and an example outer surface 1714 located opposite the inner surface 1712.

In the illustrated example of FIG. 17, the structurally tunable core 1702 includes example resilient core members 1716 arranged and/or spaced apart from one another about a circumference of the outer surface 1710 of the first annulus 1704. Respective ones of the resilient core members 1716 of FIG. 17 extend radially outwardly from the outer surface 1710 of the first annulus 1704 of FIG. 17 to the inner surface 1712 of the second annulus 1706 of FIG. 17. Each one of the resilient core members 1716 of FIG. 17 includes an example first end 1718 coupled to the outer surface 1710 of the first annulus 1704, and an example second end 1720 located opposite the first end 1718 and coupled to the inner surface 1712 of the second annulus 1706. In the illustrated example of FIG. 17, each one of the resilient core members 1716 is implemented by two of the resilient core base elements 600 of FIG. 6 described above. In other examples, one or more of the resilient core members 1716 of FIG. 17 can be implemented by a different number (e.g., one, three, four, etc.) of the resilient core base elements 600.

In some examples, the first end 1718 of each one of the resilient core members 1716 is integrally formed (e.g., as a single-piece, joint-free structure) with the first annulus 1704. In other examples, the first end 1718 of each one of the resilient core members 1716 is coupled to the outer surface 1710 of the first annulus 1704 via a corresponding pi joint (e.g., the pi joint 700 of FIG. 7 described above) located along the outer surface 1710 of the first annulus 1704. In some such examples, the pi joints are bonded and/or mechanically fastened to the outer surface 1710 of the first annulus 1704. In other such examples, the pi joints are integrally formed with the first annulus 1704 along the outer surface 1710 of the first annulus 1704.

In some examples, the second end 1720 of each one of the resilient core members 1716 is integrally formed (e.g., as a single-piece, joint-free structure) with the second annulus 1706. In other examples, the second end 1720 of each one of the resilient core members 1716 is coupled to the inner surface 1712 of the second annulus 1706 via a corresponding pi joint (e.g., the pi joint 700 of FIG. 7 described above) located along the inner surface 1712 of the second annulus 1706. In some such examples, the pi joints are bonded and/or mechanically fastened to the inner surface 1712 of the second annulus 1706. In other such examples, the pi joints are integrally formed with the second annulus 1706 along the inner surface 1712 of the second annulus 1706.

The structurally tunable core 1702 of FIG. 17 is shown configured in a first configuration. In the first configuration of the structurally tunable core 1702 shown in FIG. 17, respective ones of the resilient core members 1716 are uniformly spaced apart from one another moving about the circumference of the outer surface 1710 of the first annulus 1704 of FIG. 17. In other examples, the relative spacing between respective ones of the resilient core members 1716 can be non-uniform. In the illustrated example of FIG. 17, respective ones of the resilient core members 1716 of the structurally tunable core 1702 have corresponding respective structural profiles including heights, thicknesses, and radii of curvature. In the first configuration of the structurally tunable core 1702 shown in FIG. 17, the structural profiles of the resilient core members 1716 of FIG. 17 are uniform relative to one another. Thus, each one of the resilient core members 1716 of the structurally tunable core 1702 of FIG. 17 has a structural profile that includes matching (e.g., same) heights, thicknesses, and radii of curvature relative to other ones of the resilient core members 1716 of the structurally tunable core 1702. In other examples and/or configurations of the structurally tunable core 1702, respective ones of the resilient core members 1716 can have differing and/or varying structural profiles relative to one another.

In the illustrated example of FIG. 17, the structurally tunable core 1702 further includes example elastomeric members 1722 positioned and/or extending between various neighboring ones of the resilient core members 1716 of the structurally tunable core 1702. For example, an example first one 1724 of the resilient core members 1716 of FIG. 17 is spaced apart from and neighbors an example second one 1726 of the resilient core members 1716, the second one 1726 of the resilient core members 1716 is spaced apart from and neighbors an example third one 1728 of the resilient core members 1716, and the third one 1728 of the resilient core members 1716 is spaced apart from and neighbors an example fourth one 1730 of the resilient core members 1716. An example first one 1732 of the elastomeric members 1722 is positioned and/or extends between the first one 1724 and the second one 1726 of the resilient core members 1716, and a second one 1734 of the elastomeric members 1722 is positioned and/or extends between the third one 1728 and the fourth one 1730 of the resilient core members 1716.

In the illustrated example of FIG. 17, the space located between the second one 1726 and the third one 1728 of the resilient core members 1716 of FIG. 17 is unoccupied by any of the elastomeric members 1722. As further shown in FIG. 17, the respective ones of the elastomeric members 1722 of FIG. 17 are positioned and/or extend between every second pair of neighboring ones of the resilient core members 1716 of the structurally tunable core 1702. In other examples, the respective ones of the elastomeric members 1722 of FIG. 17 can be positioned and/or extend between a different interval (e.g., each pair, every third pair, every fourth pair, randomly-located pairs, etc.) of neighboring ones of the resilient core members 1716 of the structurally tunable core 1702.

Figure 18:
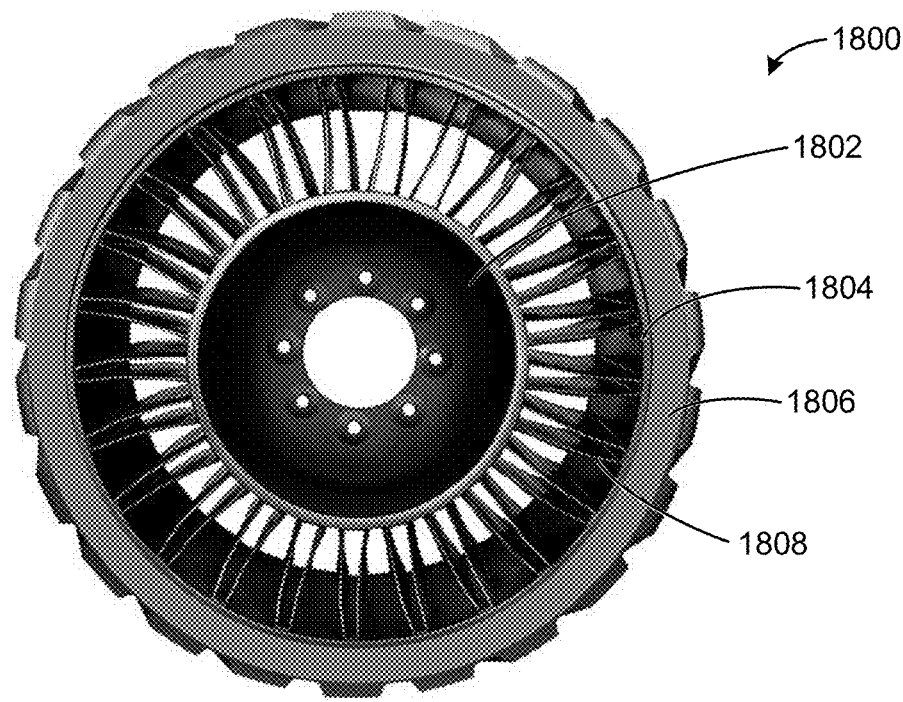
FIG. 18 is a side view of a known non-pneumatic tire.

FIG. 18 is a side view of a known non-pneumatic (e.g., airless) tire 1800. The non-pneumatic tire 1800 of FIG. 18 includes a hub 1802, a rim 1804, a tread 1806, and spokes 1808. The rim 1804 circumscribes the hub 1802, and the tread 1806 circumscribes the rim 1804. Respective ones of the spokes 1808 extend radially outwardly from the hub 1802 to the rim 1804. The tread 1806, the rim 1804 and the spokes 1808 can deflect and/or deform radially inwardly (e.g., toward the hub 1802) in response to the tread 1806 of the non-pneumatic tire 1800 of FIG. 18 contacting objects as the non-pneumatic tire traverses an environment. The tread 1806, the rim 1804 and the spokes 1808 can subsequently return to their neutral (e.g., non-deflected and/or non-deformed) shapes.

Figure 19:
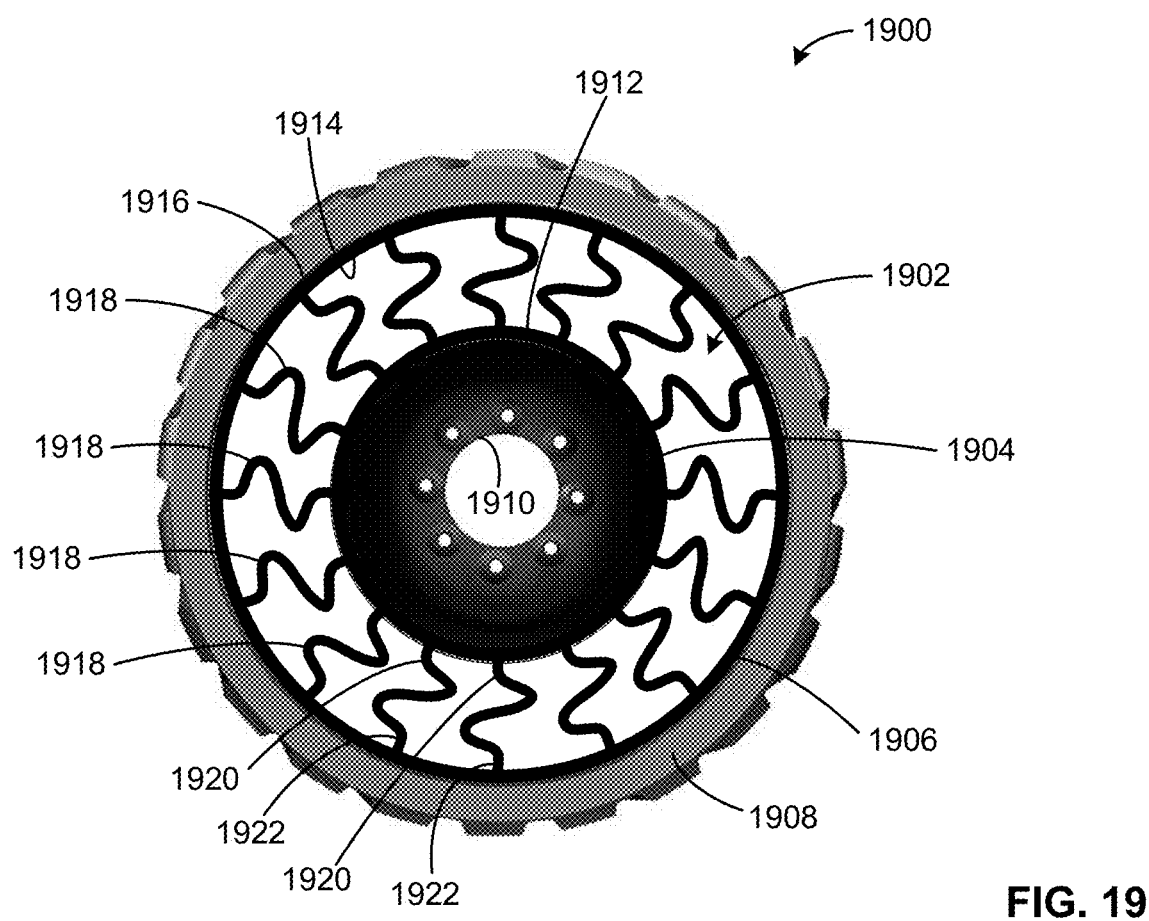
FIG. 19 is a side view of an example non-pneumatic tire including an example structurally tunable core.

FIG. 19 is a side view of an example non-pneumatic (e.g., airless) tire 1900 including an example structurally tunable core 1902. The non-pneumatic tire 1900 of FIG. 19 further includes an example hub 1904, an example rim 1906 circumscribing the hub 1904, and an example tread 1908 circumscribing the rim 1906. The hub 1904 of FIG. 19 includes an example inner surface 1910 and an example outer surface 1912 located opposite the inner surface 1910. The rim 1906 of FIG. 19 includes an example inner surface 1914 and an example outer surface 1916 located opposite the inner surface 1914.

In the illustrated example of FIG. 19, the structurally tunable core 1902 includes example resilient core members 1918 arranged and/or spaced apart from one another about a circumference of the outer surface 1912 of the hub 1904. Respective ones of the resilient core members 1918 of FIG. 19 extend radially outwardly from the outer surface 1912 of the hub 1904 of FIG. 19 to the inner surface 1914 of the rim 1906 of FIG. 19. Each one of the resilient core members 1918 of FIG. 19 includes an example first end 1920 coupled to the outer surface 1912 of the hub 1904, and an example second end 1922 located opposite the first end 1920 and coupled to the inner surface 1914 of the rim 1906. In the illustrated example of FIG. 19, each one of the resilient core members 1918 is implemented by two of the resilient core base elements 600 of FIG. 6 described above. In other examples, one or more of the resilient core members 1918 of FIG. 19 can be implemented by a different number (e.g., one, three, four, etc.) of the resilient core base elements 600.

In some examples, the first end 1920 of each one of the resilient core members 1918 is integrally formed (e.g., as a single-piece, joint-free structure) with the hub 1904. In other examples, the first end 1920 of each one of the resilient core members 1918 is coupled to the outer surface 1912 of the hub 1904 via a corresponding pi joint (e.g., the pi joint 700 of FIG. 7 described above) located along the outer surface 1912 of the hub 1904. In some such examples, the pi joints are bonded and/or mechanically fastened to the outer surface 1912 of the hub 1904. In other such examples, the pi joints are integrally formed with the hub 1904 along the outer surface 1912 of the hub 1904.

In some examples, the second end 1922 of each one of the resilient core members 1918 is integrally formed (e.g., as a single-piece, joint-free structure) with the rim 1906. In other examples, the second end 1922 of each one of the resilient core members 1918 is coupled to the inner surface 1914 of the rim 1906 via a corresponding pi joint (e.g., the pi joint 700 of FIG. 7 described above) located along the inner surface 1914 of the rim 1906. In some such examples, the pi joints are bonded and/or mechanically fastened to the inner surface 1914 of the rim 1906. In other such examples, the pi joints are integrally formed with the rim 1906 along the inner surface 1914 of the rim 1906.

The structurally tunable core 1902 of FIG. 19 is shown configured in a first configuration. In the first configuration of the structurally tunable core 1902 shown in FIG. 19, respective ones of the resilient core members 1918 are uniformly spaced apart from one another moving about the circumference of the outer surface 1912 of the hub 1904 of FIG. 19. In other examples, the relative spacing between respective ones of the resilient core members 1918 can be non-uniform. In the illustrated example of FIG. 19, respective ones of the resilient core members 1918 of the structurally tunable core 1902 have corresponding respective structural profiles including heights, thicknesses, and radii of curvature. In the first configuration of the structurally tunable core 1902 shown in FIG. 19, the structural profiles of the resilient core members 1918 of FIG. 19 are uniform relative to one another. Thus, each one of the resilient core members 1918 of the structurally tunable core 1902 of FIG. 19 has a structural profile that includes matching (e.g., same) heights, thicknesses, and radii of curvature relative to other ones of the resilient core members 1918 of the structurally tunable core 1902. In other examples and/or configurations of the structurally tunable core 1902, respective ones of the resilient core members 1918 can have differing and/or varying structural profiles relative to one another.

From the foregoing, it will be appreciated that the disclosed structurally tunable cores facilitate a newly-attainable design space that enables the fabrication of components and/or structures (e.g., aircraft components and/or structures) which can be tuned, configured, customized and/or optimized based on desired operational capabilities (e.g., stiffnesses, deflections, etc.). Unlike the components of the known flex beam designs described above, the disclosed structurally tunable cores can be used to implement flex beams that advantageously enable a relatively high degree and/or extent of vertical deflection (flapping) to be attained while maintaining adequate chordwise and spanwise stiffnesses. The increased degree and/or extent of vertical deflection provided by the disclosed structurally tunable cores advantageously reduces the degree and/or extent of drag associated with the aircraft rotor (e.g., drag associated with the rotating blades of the aircraft rotor), and also advantageously reduces the degree and/or extent of maintenance associated with the aircraft rotor. The disclosed structurally tunable cores can advantageously be implemented in a variety of components and/or structures including, for example, the flex beams, the hybrid elastomeric bearings, and the non-pneumatic tires disclosed above.

In some examples, a flex beam for coupling a rotor blade to a rotor hub is disclosed. In some disclosed examples, the flex beam comprises a first composite laminate, a second composite laminate, a third composite laminate, first resilient core members, and second resilient core members. In some disclosed examples, the first composite laminate forms a first skin of the flex beam. In some disclosed examples, the second composite laminate is located opposite the first composite laminate and forms a second skin of the flex beam. In some disclosed examples, the third composite laminate is located between the first composite laminate and the second composite laminate. In some disclosed examples, the first resilient core members extend between the first composite laminate and the third composite laminate. In some disclosed examples, the second resilient core members extend between the second composite laminate and the third composite laminate.

In some disclosed examples, respective ones of the first resilient core members are coupled to the first composite laminate via corresponding respective pi joints.

In some disclosed examples, respective ones of the first resilient core members include a first segment, a second segment, and a third segment. In some disclosed examples, the first segment has a first height and a first thickness. In some disclosed examples, the second segment extends from the first segment in a first direction defined by a first radius of curvature between the first and second segments. In some disclosed examples, the second segment has a second height and a second thickness. In some disclosed examples, the third segment extends from the second segment in a second direction defined by a second radius of curvature between the second and third segments. In some disclosed examples, the third segment has a third height and a third thickness.

In some disclosed examples, the first height is greater than the second height, and the third height is greater than the first height.

In some disclosed examples, the first thickness, the second thickness and the third thickness are substantially equal to one another.

In some disclosed examples, the first radius of curvature is substantially equal to the second radius of curvature.

In some disclosed examples, respective ones of the first resilient core members are uniformly spaced apart from one another.

In some disclosed examples, a first one of the first resilient core members is spaced apart from a second one of the first resilient core members by a first distance, and the second one of the first resilient core members is spaced apart from a third one of the first resilient core members by a second distance greater than the first distance.

In some disclosed examples, respective ones of the first resilient core members have corresponding respective first structural profiles including first heights, first thicknesses, and first radii of curvature. In some disclosed examples, respective ones of the second resilient core members have corresponding respective second structural profiles including second heights, second thicknesses, and second radii of curvature.

In some disclosed examples, respective ones of the first structural profiles are uniform, respective ones of the second structural profiles are uniform, and the second structural profiles match the first structural profiles.

In some disclosed examples, respective ones of the first structural profiles are uniform, respective ones of the second structural profiles are uniform, and the second heights of the second structural profiles differ from the first heights of the first structural profiles.

In some disclosed examples, respective ones of the first structural profiles are uniform, respective ones of the second structural profiles are uniform, and the second thicknesses of the second structural profiles differ from the first thicknesses of the first structural profiles.

In some disclosed examples, respective ones of the first structural profiles are uniform, respective ones of the second structural profiles are uniform, and the second radii of curvature of the second structural profiles differ from the first radii of curvature of the first structural profiles.

In some disclosed examples, a first one of the first thicknesses differs from a second one of the first thicknesses.

In some disclosed examples, a first one of the first radii of curvature differs from a second one of the first radii of curvature.

In some disclosed examples, the first composite laminate includes a first linear segment, a second linear segment, and a downwardly-concave segment extending between the first and second linear segments. In some disclosed examples, the second composite laminate includes a third linear segment, a fourth linear segment, and an upwardly-concave segment extending between the third and fourth linear segments. In some disclosed examples, the downwardly-concave and upwardly-concave segments are configured to define a bending location of the flex beam.

In some disclosed examples, a first one of the first resilient core members is spaced apart from a second one of the first resilient core members, the second one of the first resilient core members is spaced apart from a third one of the first resilient core members, and the third one of the first resilient core members is spaced apart from a fourth one of the first resilient core members. In some disclosed examples, the flex beam further comprises a first elastomeric member extending between the first and second ones of the first resilient core members, and a second elastomeric member extending between the third and fourth ones of the first resilient core members.

In some examples, an apparatus is disclosed. In some disclosed examples, the apparatus comprises a first composite laminate, a second composite laminate, a third composite laminate, first resilient core members, and second resilient core members. In some disclosed examples, the first composite laminate forms a first skin. In some disclosed examples, the second composite laminate is located opposite the first composite laminate and forms a second skin. In some disclosed examples, the third composite laminate is located between the first composite laminate and the second composite laminate. In some disclosed examples, the first resilient core members extend between the first composite laminate and the third composite laminate. In some disclosed examples, the second resilient core members extend between the second composite laminate and the third composite laminate.

In some disclosed examples, respective ones of the first resilient core members are coupled to the first composite laminate via corresponding respective pi joints.

In some disclosed examples, respective ones of the first resilient core members include a first segment, a second segment, and a third segment. In some disclosed examples, the first segment has a first height and a first thickness. In some disclosed examples, the second segment extends from the first segment in a first direction defined by a first radius of curvature between the first and second segments. In some disclosed examples, the second segment has a second height and a second thickness. In some disclosed examples, the third segment extends from the second segment in a second direction defined by a second radius of curvature between the second and third segments. In some disclosed examples, the third segment has a third height and a third thickness.

In some examples, a hybrid elastomeric bearing is disclosed. In some disclosed examples, the hybrid elastomeric bearing comprises a first annulus, a second annulus, resilient core members, a first elastomeric member, and a second elastomeric member. In some disclosed examples, the second annulus circumscribes the first annulus. In some disclosed examples, the resilient core members are arranged about a circumference of the first annulus and extend radially outwardly from the first annulus to the second annulus. In some disclosed examples, respective ones of the resilient core members are spaced apart from one another and include a first segment, a second segment, and a third segment. In some disclosed examples, the second segment extends from the first segment in a first direction defined by a first radius of curvature between the first and second segments. In some disclosed examples, the third segment extends from the second segment in a second direction defined by a second radius of curvature between the second and third segments. In some disclosed examples, the first elastomeric member extends between first neighboring ones of the resilient core members. In some disclosed examples, the second elastomeric member extends between second neighboring ones of the resilient core members. In some disclosed examples, the second neighboring ones are spaced apart from the first neighboring ones.

In some examples, a non-pneumatic tire is disclosed. In some disclosed examples, the non-pneumatic tire comprises a hub, a rim, and resilient core members. In some disclosed examples, the rim circumscribes the hub. In some disclosed examples, the resilient core members are arranged about a circumference of the hub and extend radially outwardly from the hub to the rim. In some disclosed examples, respective ones of the resilient core members are spaced apart from one another and include a first segment, a second segment, and a third segment. In some disclosed examples, the second segment extends from the first segment in a first direction defined by a first radius of curvature between the first and second segments. In some disclosed examples, the third segment extends from the second segment in a second direction defined by a second radius of curvature between the second and third segments.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A flex beam for coupling a rotor blade to a rotor hub, the flex beam comprising:
    a first composite laminate forming a first skin of the flex beam;
    a second composite laminate located opposite the first composite laminate and forming a second skin of the flex beam;
    a third composite laminate located between the first composite laminate and the second composite laminate;
    a plurality of first resilient core members, each one of the plurality of first resilient core members extending transversely from the first composite laminate to the third composite laminate, each one of the plurality of first resilient core members including:
        a first segment having a first height and a first thickness;
        a second segment extending from the first segment in a first direction defined by a first radius of curvature between the first and second segments, the second segment having a second height and a second thickness; and
        a third segment extending from the second segment in a second direction defined by a second radius of curvature between the second and third segments, the third segment having a third height and a third thickness; and
    a plurality of second resilient core members, each one of the plurality of second resilient core members extending transversely from the second composite laminate to the third composite laminate.

2. The flex beam of claim 1, wherein each one of the plurality of first resilient core members is coupled to the first composite laminate via a corresponding one of a plurality of pi joints.

3. The flex beam of claim 1, wherein the first height is greater than the second height, and the third height is greater than the first height.

4. The flex beam of claim 1, wherein the first thickness, the second thickness and the third thickness are substantially equal to one another.

5. The flex beam of claim 1, wherein the first radius of curvature is substantially equal to the second radius of curvature.

6. The flex beam of claim 1, wherein respective ones of the plurality of first resilient core members are uniformly spaced apart from one another.

7. The flex beam of claim 1, wherein a first one of the plurality of first resilient core members is spaced apart from a second one of the plurality of first resilient core members by a first distance, and the second one of the plurality of first resilient core members is spaced apart from a third one of the plurality of first resilient core members by a second distance greater than the first distance.

8. The flex beam of claim 1, wherein respective ones of the plurality of first resilient core members have corresponding respective first structural profiles including first profile heights, first profile thicknesses, and first profile radii of curvature, and wherein respective ones of the plurality of second resilient core members have corresponding respective second structural profiles including second profile heights, second profile thicknesses, and second profile radii of curvature.

9. The flex beam of claim 8, wherein the corresponding respective first structural profiles are uniform, the corresponding respective second structural profiles are uniform, and the corresponding respective second structural profiles match the corresponding respective first structural profiles.

10. The flex beam of claim 8, wherein the corresponding respective first structural profiles are uniform, the corresponding respective second structural profiles are uniform, and the second profile heights of the corresponding respective second structural profiles differ from the first profile heights of the corresponding respective first structural profiles.

11. The flex beam of claim 8, wherein the corresponding respective first structural profiles are uniform, the corresponding respective second structural profiles are uniform, and the second profile thicknesses of the corresponding respective second structural profiles differ from the first profile thicknesses of the corresponding respective first structural profiles.

12. The flex beam of claim 8, wherein the corresponding respective first structural profiles are uniform, the corresponding respective second structural profiles are uniform, and the second profile radii of curvature of the corresponding respective second structural profiles differ from the first profile radii of curvature of the corresponding respective first structural profiles.

13. The flex beam of claim 8, wherein a first one of the first profile thicknesses differs from a second one of the first profile thicknesses.

14. The flex beam of claim 8, wherein a first one of the first profile radii of curvature differs from a second one of the first profile radii of curvature.

15. The flex beam of claim 1, wherein the first composite laminate includes a first linear segment, a second linear segment, and a downwardly-concave segment extending between the first and second linear segments, and wherein the second composite laminate includes a third linear segment, a fourth linear segment, and an upwardly-concave segment extending between the third and fourth linear segments, the downwardly-concave and upwardly-concave segments being configured to define a bending location of the flex beam.

16. The flex beam of claim 1, wherein a first one of the plurality of first resilient core members is spaced apart from a second one of the plurality of first resilient core members, the second one of the plurality of first resilient core members is spaced apart from a third one of the plurality of first resilient core members, and the third one of the plurality of first resilient core members is spaced apart from a fourth one of the plurality of first resilient core members, the flex beam further comprising a first elastomeric member extending between the first and second ones of the plurality of first resilient core members, and a second elastomeric member extending between the third and fourth ones of the plurality of first resilient core members.

17. A flex beam for coupling a rotor blade to a rotor hub, the flex beam comprising:
a first composite laminate forming a first skin of the flex beam;
a second composite laminate located opposite the first composite laminate and forming a second skin of the flex beam;
a third composite laminate located between the first composite laminate and the second composite laminate;
a plurality of first resilient core members, each one of the plurality of first resilient core members extending transversely from the first composite laminate to the third composite laminate, each one of the plurality of first resilient core members including:
a first segment;
a second segment extending from the first segment in a first direction defined by a first radius of curvature between the first and second segments; and
a third segment extending from the second segment in a second direction defined by a second radius of curvature between the second and third segments; and
a plurality of second resilient core members, each one of the plurality of second resilient core members extending transversely from the second composite laminate to the third composite laminate.

18. The flex beam of claim 17, wherein each one of the plurality of first resilient core members is coupled to the first composite laminate via a corresponding one of a plurality of pi joints.

19. The flex beam of claim 17, wherein the first segment of each one of the plurality of first resilient core members has a first height and a first thickness, the second segment of each one of the plurality of first resilient core members has a second height and a second thickness, and the third segment of each one of the first resilient core members has a third height and a third thickness.

20. The flex beam of claim 19, wherein the first height is greater than the second height, and the third height is greater than the first height.

21. The flex beam of claim 19, wherein the first thickness, the second thickness and the third thickness are substantially equal to one another.

22. The flex beam of claim 17, wherein the first radius of curvature is substantially equal to the second radius of curvature.

23. The flex beam of claim 17, wherein respective ones of the plurality of first resilient core members are uniformly spaced apart from one another.

24. The flex beam of claim 17, wherein a first one of the plurality of first resilient core members is spaced apart from a second one of the plurality of first resilient core members by a first distance, and the second one of the plurality of first resilient core members is spaced apart from a third one of the plurality of first resilient core members by a second distance greater than the first distance.

25. The flex beam of claim 17, wherein the first composite laminate includes a first linear segment, a second linear segment, and a downwardly-concave segment extending between the first and second linear segments, and wherein the second composite laminate includes a third linear segment, a fourth linear segment, and an upwardly-concave segment extending between the third and fourth linear segments, the downwardly-concave and upwardly-concave segments being configured to define a bending location of the flex beam.

26. The flex beam of claim 17, wherein a first one of the plurality of first resilient core members is spaced apart from a second one of the plurality of first resilient core members, the second one of the plurality of first resilient core members is spaced apart from a third one of the plurality of first resilient core members, and the third one of the plurality of first resilient core members is spaced apart from a fourth one of the plurality of first resilient core members, the flex beam further comprising a first elastomeric member extending between the first and second ones of the plurality of first resilient core members, and a second elastomeric member extending between the third and fourth ones of the plurality of first resilient core members.

* * * * *